United States Patent
Schneider

(10) Patent No.: US 11,312,657 B2
(45) Date of Patent: Apr. 26, 2022

(54) GLASS-BASED ARTICLES WITH IMPROVED STRESS PROFILES

(71) Applicant: CORNING INCORPORATED, Corning, NY (US)

(72) Inventor: Vitor Marino Schneider, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 190 days.

(21) Appl. No.: 16/458,583

(22) Filed: Jul. 1, 2019

(65) Prior Publication Data

US 2020/0002225 A1    Jan. 2, 2020

Related U.S. Application Data

(60) Provisional application No. 62/693,134, filed on Jul. 2, 2018.

(51) Int. Cl.
*C03C 21/00* (2006.01)
*C03C 3/091* (2006.01)
*C03C 3/097* (2006.01)

(52) U.S. Cl.
CPC .......... *C03C 21/005* (2013.01); *C03C 3/091* (2013.01); *C03C 3/097* (2013.01); *C03C 2201/10* (2013.01); *C03C 2201/28* (2013.01); *C03C 2201/50* (2013.01); *C03C 2204/00* (2013.01)

(58) Field of Classification Search
None
See application file for complete search history.

(56) References Cited

U.S. PATENT DOCUMENTS

| | | | |
|---|---|---|---|
| 3,433,611 A * | 3/1969 | Kubichan | C03C 3/097 65/30.14 |
| 8,312,739 B2 | 11/2012 | Lee et al. | |
| 8,561,429 B2 | 10/2013 | Allan et al. | |
| 8,854,623 B2 | 10/2014 | Fontaine et al. | |
| 2017/0295657 A1* | 10/2017 | Gross | H05K 5/0017 |
| 2019/0016627 A1* | 1/2019 | Li | C03C 4/18 |
| 2019/0337844 A1* | 11/2019 | Ikeda | C03C 3/087 |
| 2019/0389764 A1* | 12/2019 | Andrews | C03C 3/085 |

FOREIGN PATENT DOCUMENTS

| | | |
|---|---|---|
| WO | 2007032961 A2 | 3/2007 |
| WO | 2017087742 A1 | 5/2017 |
| WO | 2017120424 A1 | 7/2017 |

OTHER PUBLICATIONS

Invitation To Pay Additional Fees of the International Searching Authority; PCT/US2019/040056; dated Oct. 15, 2019; 14 pgs.
(Continued)

*Primary Examiner* — David Sample
(74) *Attorney, Agent, or Firm* — Kevin M. Johnson

(57) ABSTRACT

Glass-based articles are manufactured by a unique ion exchange process that results in glass-based articles having improved stress profiles with higher stress values at moderate depths. A medium of the ion exchange process includes ions of two or more alkali metals of two or more alkali metal oxides in a base composition of a glass-based substrate in a ratio such that ions of each alkali metal are in chemical equilibrium with each of the respective alkali metals of the alkali metal oxides in the base glass composition.

18 Claims, 23 Drawing Sheets

(56) References Cited

OTHER PUBLICATIONS

Araujo et al.; "Ion Exvhange Equilibria Between Glass and Molten Salts"; Journal of Non-Crystalline Solids, vol. 318, pp. 262-267, 2003.
Garfinkel; "Ion-Exchange Equilibria Between Glass and Molton Salts"; J. Phys Chem, vol. 72, No. 12, pp. 4175-4181, Nov. 1968.
Luceo; "FSM-6000LE Operation Manual" 9 Pages; Downloaded Sep. 9, 2019; https://mundan.net/supplier/luceo/products/fsm-6000le.html.

* cited by examiner

GLASS-BASED ARTICLES WITH IMPROVED STRESS PROFILES

CROSS-REFERENCE TO RELATED APPLICATIONS

This application claims the benefit of priority under 35 U.S.C. § 119 of U.S. Provisional Application Ser. No. 62/693,134 filed on Jul. 2, 2018, the content of which is relied upon and incorporated herein by reference in its entirety.

FIELD

Embodiments of the disclosure generally relate to glass-based articles having improved stress profiles and methods for manufacturing the same.

BACKGROUND

Glass-based articles are used in many various industries including consumer electronics, transportation, architecture, defense, medical, and packaging. For consumer electronics, glass-based articles are used in electronic devices as cover plates or windows for portable or mobile electronic communication and entertainment devices, such as mobile phones, smart phones, tablets, video players, information terminal (IT) devices, laptop computers, navigation systems and the like. In architecture, glass-based articles are included in windows, shower panels, and countertops; and in transportation, glass-based articles are present in automobiles, trains, aircraft, and sea-craft. Glass-based articles are suitable for any application that requires superior fracture resistance but thin and light-weight articles. For each industry, mechanical and/or chemical reliability of the glass-based articles is typically driven by functionality, performance, and cost. Improving the mechanical and/or chemical reliability of these articles is an ongoing goal.

Chemical treatment is a strengthening method to impart a desired/engineered stress profile having one or more of the following parameters: compressive stress (CS), depth of compression (DOC), and maximum central tension (CT). Many glass-based articles, including those with engineered stress profiles, have a compressive stress that is highest or at a peak at the glass surface and reduces from a peak value moving away from the surface, and there is zero stress at some interior location of the glass article before the stress in the glass article becomes tensile. Chemical strengthening by ion exchange (IOX) of alkali-containing glass is a proven methodology in this field.

In the consumer electronics industry, chemically-strengthened glass is used as a preferred material for display covers due to better aesthetics and scratch resistance compared to plastics, and better drop performance plus better scratch resistance compared to non-strengthened glass.

There is an on-going need provide glass-based articles having mechanical and/or chemical reliability for their industry. There is also an ongoing need to do so in cost-effective ways.

SUMMARY

Aspects of the disclosure pertain to glass-based articles and methods for their manufacture.

An aspect is a glass-based article comprising: a glass-based substrate having opposing first and second surfaces defining a substrate thickness (t); a central composition at the center of the glass-based article containing two or more alkali metal oxides; a surface concentration of each of the two or more alkali metal oxides being non-zero at one or both of the first and second surfaces; and a metal oxide, different from the two or more alkali metal oxides of the central composition, having a non-zero concentration that varies from the first surface to a depth of layer (DOL) with respect to the metal oxide; wherein at thicknesses deeper than about three times the DOL, a concentration of each of the two or more alkali metal oxides is within 10% of a respective concentration of each of the two or more alkali metal oxides in the central composition.

Another aspect is a glass-based article comprising: a glass-based substrate having opposing first and second surfaces defining a substrate thickness (t); a central composition at the center of the glass-based article containing two or more alkali metal oxides; a surface concentration of each of the two or more alkali metal oxides being non-zero at one or both of the first and second surfaces; a metal oxide, different from the two or more alkali metal oxides of the central composition, having a non-zero concentration that varies from the first and second surfaces to a depth of layer (DOL) of the metal oxide; and a stress profile comprising: a spike region extending from the first surface to a transition region; the transition region extending to a tail region; and the tail region extending to a center of the glass-based article; wherein the transition region comprises a first compressive stress at greater than or equal to about 0.00625·t depth from the first surface is at least about 150 MPa, and a second compressive stress at greater than or equal to about 0.025·t depth from the first surface is at least about 120 MPa.

A detailed aspect is a glass-based article comprising: a glass-based substrate having opposing first and second surfaces defining a substrate thickness (t); a central composition at the center of the glass-based article containing lithium and one or more additional alkali metal oxides; a surface concentration of each of the lithium and the one or more additional alkali metal oxides being non-zero at one or both of the first and second surfaces; a metal oxide, different from lithium and the one or more additional alkali metal oxides of the central composition, having a non-zero concentration that varies from the first and second surfaces to a depth of layer (DOL) of the metal oxide; a depth of compression (DOC) that is greater than or equal to about 0.13·t; and a first compressive stress at from about 5 micrometers to 10 micrometers depth from the first surface is at least 150 MPa, and a second compressive stress at from about 15 micrometers to about 20 micrometers depth from the first surface is at least 120 MPa.

A further aspect is a consumer electronic product comprising: a housing having a front surface, a back surface, and side surfaces; electrical components provided at least partially within the housing, the electrical components including at least a controller, a memory, and a display, the display being provided at or adjacent the front surface of the housing; and a cover disposed over the display; wherein a portion of at least one of the housing and the cover comprises the glass-based article according to any aspect or embodiment disclosed herein.

In another aspect, a method of manufacturing a glass-based article comprises: exposing a glass-based substrate that contains two or more alkali metal oxides in a base composition, the glass-based substrate having opposing first and second surfaces defining a substrate thickness (t), to an ion exchange treatment to form the glass-based article, the ion exchange treatment including a bath comprising: first metal ions that are different from the two or more alkali metals of the alkali metal oxides in the base composition; and ions of the two or more alkali metals of the two or more alkali metal oxides in the base composition in a ratio such that ions of each alkali metal are in chemical equilibrium with each of the respective alkali metals of the alkali metal oxides in the base composition.

In another aspect, a method manufacturing a glass-based article comprises: exposing a glass-based substrate that contains two or more alkali metal oxides in a base composition, the glass-based substrate having opposing first and second surfaces defining a substrate thickness (t), to a first ion exchange treatment to form a doped glass-based substrate, the first ion exchange treatment including a first bath comprising: first metal ions that are different from the two or more alkali metals of the alkali metal oxides in the base composition; and ions of the two or more alkali metals of the two or more alkali metal oxides in the base composition in a ratio such that ions of each alkali metal are in chemical equilibrium with each of the respective alkali metals of the alkali metal oxides in the base composition; thereafter exposing the doped glass-based substrate to a second ion exchange treatment including a second bath comprising second metal ions to form the glass-based article; and optionally further comprising additional strengthening treatments selected from the group consisting of: ion exchange, thermal annealing, and combinations thereof.

According to aspect (1), a glass-based article is provided. The glass-based article comprises: opposing first and second surfaces defining a thickness (t); a central composition at the center of the glass-based article containing two alkali metal oxides; a surface concentration of each of the two alkali metal oxides being non-zero at one or both of the first and second surfaces; and a metal oxide, different from the two alkali metal oxides of the central composition, having a non-zero concentration that varies from the first surface to a depth of layer (DOL) with respect to the metal oxide. At a depth of about three times the DOL, a concentration of each of the two alkali metal oxides is within 10% of a respective concentration of each of the two alkali metal oxides in the central composition.

According to aspect (2), the glass-based article of aspect (1) is provided, wherein the concentration of each of the two alkali metal oxides at the depth of about three times the DOL is +5% of the respective concentration of each of the two alkali metal oxides in the central composition.

According to aspect (3), the glass-based article of aspect (1) or (2) is provided, wherein at the first surface, the surface concentration of each of the two alkali metal oxides are +5% of the respective concentration of each of the two alkali metal oxides in the central composition.

According to aspect (4), the glass-based article of one of aspects (1) to (3) is provided, wherein the glass-based article comprises an alkali-aluminosilicate, an alkali-containing borosilicate, an alkali-containing aluminoborosilicate, or an alkali-containing phosphosilicate.

According to aspect (5), the glass-based article of one of aspects (1) to (4) is provided, wherein the central composition comprises 1 mol % or less of the metal oxide different from the two alkali metal oxides of the central composition.

According to aspect (6), the glass-based article of one of aspects (1) to (5) is provided, wherein the metal oxide different from the two alkali metal oxides of the central composition is selected from the group consisting of: lithium (Li), sodium (Na), potassium (K), rubidium (Rb), cesium (Cs), francium (Fr), silver (Ag), gold (Au), copper (Cu), and combinations thereof.

According to aspect (7), the glass-based article of one of aspects (1) to (6) is provided, wherein the two alkali metal oxides of the central composition comprise lithium and sodium, and the metal oxide different from the two alkali metal oxides of the central composition is potassium.

According to aspect (8), the glass-based article of one of aspects (1) to (7) is provided, comprising a stress profile that comprises: a spike region extending from the first surface to a transition region; a transition region extending to a tail region; and a tail region extending to a center of the glass-based article. All points of the stress profile located in the spike region comprise a tangent having an absolute value that is 20 MPa/micrometer or greater, all points of the stress profile located in the transition region comprise a tangent having an absolute value that is less than 20 MPa/micrometer, and all points of the stress profile located in the tail region comprise a tangent having an absolute value that is less than the absolute values of the tangents of the transition region.

According to aspect (9), the glass-based article of one of aspects (1) to (8) is provided, wherein t is in the range of from 50 micrometers to 5 millimeters.

According to aspect (10), a glass-based article is provided. The glass-based article comprises: opposing first and second surfaces defining a thickness (t); a central composition at the center of the glass-based article containing two alkali metal oxides; a surface concentration of each of the two alkali metal oxides being non-zero at one or both of the first and second surfaces; a metal oxide, different from the two alkali metal oxides of the central composition, having a non-zero concentration that varies from the first and second surfaces to a depth of layer (DOL) of the metal oxide; and a stress profile. The stress profile comprising: a spike region extending from the first surface to a transition region; the transition region extending to a tail region; and the tail region extending to a center of the glass-based article; wherein the transition region comprises a first compressive stress at greater than or equal to about 0.00625·t depth from the first surface of at least about 150 MPa, and a second compressive stress at greater than or equal to about 0.025·t depth from the first surface of at least about 120 MPa.

According to aspect (11), the glass-based article of aspect (10) is provided, wherein the first compressive stress is located between about 5 and 10 micrometers depth from the first surface and is in the range of about 150 MPa to about 300 MPa, and the second compressive stress is located between about 15 and 20 micrometers depth from the first surface and is in the range of about 120 MPa to about 240 MPa.

According to aspect (12), the glass-based article of one of aspects (10) or (11) is provided, wherein the glass-based article comprises an alkali-aluminosilicate, an alkali-containing borosilicate, an alkali-containing aluminoborosilicate, or an alkali-containing phosphosilicate.

According to aspect (13), the glass-based article of one of aspects (10) to (12) is provided, wherein the central composition comprises 1 mol % or less of the metal oxide different from the two alkali metal oxides of the central composition.

According to aspect (14), the glass-based article of one of aspects (10) to (13) is provided, wherein the metal oxide different from the two alkali metal oxides of the central composition is selected from the group consisting of: lithium (Li), sodium (Na), potassium (K), rubidium (Rb), cesium (Cs), francium (Fr), silver (Ag), gold (Au), copper (Cu), and combinations thereof.

According to aspect (15), the glass-based article of one of aspects (10) to (14) is provided, comprising a depth of compression (DOC) that is greater than or equal to 0.13·t.

According to aspect (16), the glass-based article of one of aspects (10) to (15) is provided, wherein all points of the stress profile located in the spike region comprise a tangent having an absolute value that is 20 MPa/micrometer or greater.

According to aspect (17), the glass-based article of one of aspects (10) to (16) is provided, wherein all points of the stress profile located in the transition region comprise a tangent having an absolute value that is less than 20 MPa/micrometer and greater than absolute values of tangents of all points of the stress profile located in the tail region.

According to aspect (18), the glass-based article of one of aspects (10) to (16) is provided, wherein all points of the stress profile located at a depth of about 15 micrometer to about 20 micrometer is less than 20 MPa/micrometer and greater than 2.0 MPa/micrometer.

According to aspect (19), the glass-based article of one of aspects (10) to (18) is provided, wherein a surface compressive stress at the first surface is 400 MPa or greater.

According to aspect (20), the glass-based article of one of aspects (10) to (19) is provided, wherein the two alkali metal oxides of the central composition comprise lithium and sodium, and the metal oxide different from the two alkali metal oxides of the central composition is potassium.

According to aspect (21), the glass-based article of one of aspects (10) to (20) is provided, wherein t is in the range of from 50 micrometers to 5 millimeters.

According to aspect (22), a glass-based article is provided. The glass-based article comprising: opposing first and second surfaces defining a thickness (t); a central composition at the center of the glass-based article containing lithium and one or more additional alkali metal oxides; a surface concentration of each of the lithium and the one or more additional alkali metal oxides being non-zero at one or both of the first and second surfaces; a metal oxide, different from lithium and the one or more additional alkali metal oxides of the central composition, having a non-zero concentration that varies from the first and second surfaces to a depth of layer (DOL) of the metal oxide; a depth of compression (DOC) that is greater than or equal to about 0.13·t; and a first compressive stress at from about 5 micrometers to 10 micrometers depth from the first surface is at least 150 MPa, and a second compressive stress at from about 15 micrometers to about 20 micrometers depth from the first surface is at least 120 MPa.

According to aspect (23), the glass-based article of aspect (22) is provided, wherein the glass-based article comprises an alkali-aluminosilicate, an alkali-containing borosilicate, an alkali-containing aluminoborosilicate, or an alkali-containing phosphosilicate.

According to aspect (24), the glass-based article of one of aspects (22) or (23) is provided, wherein the central composition comprises 1 mol % or less of the metal oxide different from the lithium and the one or more additional alkali metal oxides of the central composition.

According to aspect (25), the glass-based article of one of aspects (22) to (24) is provided, wherein the metal oxide different from the lithium and the one or more additional alkali metal oxides of the central composition is selected from the group consisting of: sodium (Na), potassium (K), rubidium (Rb), cesium (Cs), francium (Fr), silver (Ag), gold (Au), copper (Cu), and combinations thereof.

According to aspect (26), the glass-based article of one of aspects (22) to (25) is provided, wherein at a depth of 3 to 10 micrometers or more a concentration of the metal oxide different from the lithium and the one or more additional alkali metal oxides of the central composition is 5% by weight or more of all alkali metals in the glass-based article.

According to aspect (27), the glass-based article of aspect (26) is provided, wherein the metal oxide different from the lithium and the one or more additional alkali metal oxides of the central composition is potassium and the depth is 10 micrometers.

According to aspect (28), the glass-based article of aspect (26) is provided, wherein the metal oxide different from the lithium and the one or more additional alkali metal oxides of the central composition is rubidium, cesium, or francium, and the depth is 3 micrometers.

According to aspect (29), the glass-based article of one of aspects (22) to (25) is provided, wherein at a depth of 20 micrometers or more a concentration of the metal oxide different from the lithium and the one or more additional alkali metal oxides of the central composition is 0.3% by weight or more of all alkali metals in the glass-based article.

According to aspect (30), the glass-based article of aspect (29) is provided, wherein the metal oxide different from the lithium and the one or more additional alkali metal oxides of the central composition is silver, gold, or copper.

According to aspect (31), the glass-based article of one of aspects (22) to (30) is provided, wherein t is in the range of from 50 micrometers to 5 millimeters.

According to aspect (32), a consumer electronic product is provided. The consumer electronic product comprises: a housing having a front surface, a back surface, and side surfaces; electrical components provided at least partially within the housing, the electrical components including at least a controller, a memory, and a display, the display being provided at or adjacent the front surface of the housing; and a cover disposed over the display. At least a portion of at least one of the housing and the cover comprises the glass-based article of one of aspects (22) to (31).

According to aspect (33), a method of manufacturing a glass-based article is provided. The method comprises: exposing a glass-based substrate that contains two alkali metal oxides in a base composition, the glass-based substrate having opposing first and second surfaces defining a substrate thickness (t), to an ion exchange treatment to form the glass-based article, the ion exchange treatment including a medium comprising: first metal ions that are different from the two alkali metals of the alkali metal oxides in the base composition; and ions of the two alkali metals of the two alkali metal oxides in the base composition in a ratio such that ions of each alkali metal are in chemical equilibrium with each of the respective alkali metals of the alkali metal oxides in the base composition.

According to aspect (34), the method of aspect (33) is provided, wherein at a depth of about three times a depth of layer (DOL) with respect to the first metal ions, a concentration of each of the two alkali metal oxides is within 10% of a respective concentration of each of the two alkali metal oxides in the base composition.

According to aspect (35), the method of one of aspects (33) or (34) is provided, wherein a surface concentration of each of the two alkali metal oxides is non-zero at one or both of the first and second surfaces.

According to aspect (36), the method of one of aspects (33) to (35) is provided, wherein the first metal ions have a first non-zero concentration that varies from the first surface to a depth of layer (DOL) with respect to the first metal ions, and at the first surface, the surface concentration of each of the two alkali metal oxides are ±5% of the respective concentration of each of the two alkali metal oxides in the base composition.

According to aspect (37), the method of one of aspects (33) to (36) is provided, wherein the base composition comprises 1 mol % or less of oxides of the first metal ions.

According to aspect (38), the method of one of aspects (33) to (37) is provided, wherein t is in the range of from 50 micrometers to 5 millimeters.

According to aspect (39), the method of one of aspects (33) to (38) is provided, further comprising additional strengthening treatments selected from the group consisting of: ion exchange, thermal annealing, and combinations thereof.

According to aspect (40), a method of manufacturing a glass-based article is provided. The method comprises: exposing a glass-based substrate that contains two alkali metal oxides in a base composition, the glass-based substrate having opposing first and second surfaces defining a substrate thickness (t), to a first ion exchange treatment to form a doped glass-based substrate, the first ion exchange treatment including a first medium comprising: first metal ions that are different from the two alkali metals of the alkali metal oxides in the base composition; and ions of the two alkali metals of the two alkali metal oxides in the base composition in a ratio such that ions of each alkali metal are in chemical equilibrium with each of the respective alkali metals of the alkali metal oxides in the base composition; thereafter exposing the doped glass-based substrate to a second ion exchange treatment including a second medium comprising second metal ions to form the glass-based article.

According to aspect (41), the method of aspect (40) is provided, wherein at a depth of about three times a depth of layer (DOL) with respect to the first metal ions, a concentration of each of the two alkali metal oxides is within 10% of a respective concentration of each of the two alkali metal oxides in the base composition.

According to aspect (42), the method of one of aspects (40) or (41) is provided, wherein in the doped glass-based substrate, the first metal ions have a first non-zero concentration that varies from the first surface to a depth of layer (DOL) with respect to the first metal ions, and at the first surface, the surface concentration of each of the two alkali metal oxides are ±5% of the respective concentration of each of the two alkali metal oxides in the base composition.

According to aspect (43), the method of one of aspects (40) to (42) is provided, wherein the base composition comprises 1 mol % or less of oxides of the first metal ions.

According to aspect (44), the method of one of aspects (40) to (43) is provided, wherein the second medium comprises: the ions of the two alkali metals of the two alkali metal oxides in the base composition in a ratio such that ions of each alkali metal oxide are in chemical equilibrium with each of the respective alkali metals of the alkali metal oxides in the base composition; wherein the second metal ions are different from the two alkali metals in the base composition; and wherein at a depth of three times a depth of layer (DOL) with respect to the second metal ions, a concentration of each of the two alkali metals is within 10% of a respective concentration of each of the two alkali metal oxides in the base composition.

According to aspect (45), the method of one of aspects (40) to (43) is provided, wherein the second medium comprises: the ions of the two alkali metals of the two alkali metal oxides in the base composition in a ratio such that ions of each alkali metal oxide are not in chemical equilibrium with each of the respective alkali metals of the alkali metal oxides in the base composition; wherein the second metal ions are different from two alkali metals of the two alkali metal oxides in the base composition; and wherein at a depth of three times a depth of layer (DOL) with respect to the second metal ions, a concentration of each of the two alkali metals is more than 10% different from a respective concentration of each of the two alkali metal oxides in the base composition.

According to aspect (46), the method of one of aspects (40) to (45) is provided, further comprising additional strengthening treatments selected from the group consisting of: ion exchange, thermal annealing, and combinations thereof.

BRIEF DESCRIPTION OF THE DRAWINGS

The accompanying figures, which are incorporated in and constitute a part of this specification, illustrate several embodiments described below.

DETAILED DESCRIPTION

Figure 1A:
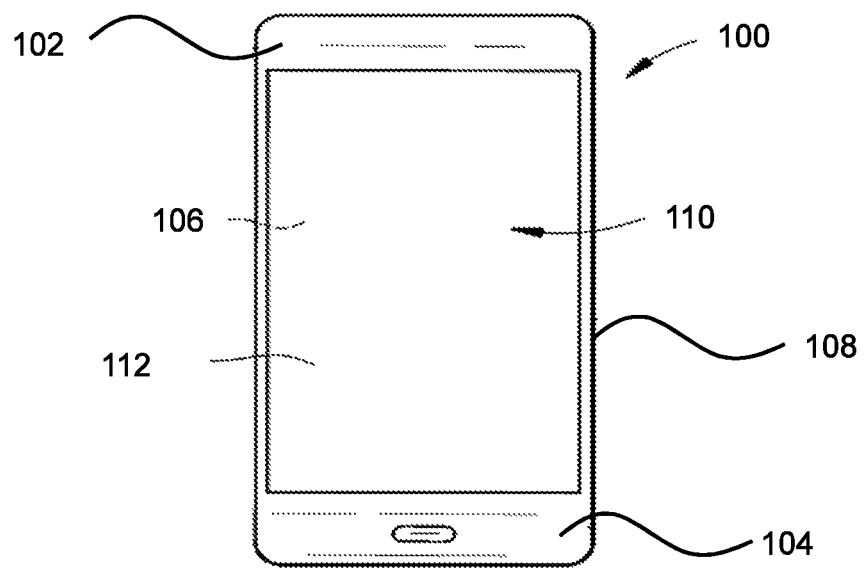
FIG. 1A is a plan view of an exemplary electronic device incorporating any of the glass-based articles disclosed herein.

Before describing several exemplary embodiments, it is to be understood that the disclosure is not limited to the details of construction or process steps set forth in the following disclosure. The disclosure provided herein is capable of other embodiments and of being practiced or being carried out in various ways.

Reference throughout this specification to "one embodiment," "certain embodiments," "various embodiments," "one or more embodiments" or "an embodiment" means that a particular feature, structure, material, or characteristic described in connection with the embodiment is included in at least one embodiment of the disclosure. Thus, the appearances of the phrases such as "in one or more embodiments," "in certain embodiments," "in various embodiments," "in one embodiment" or "in an embodiment" in various places throughout this specification are not necessarily referring to the same embodiment. Furthermore, the particular features, structures, materials, or characteristics may be combined in any suitable manner in one or more embodiments.

The terms "glass-based article" and "glass-based substrates" are used to include any object made wholly or partly of glass, including glass-ceramics (including an amorphous phase and a crystalline phase). Laminated glass-based articles include laminates of glass and non-glass materials, such as laminates of glass and crystalline materials. Glass-based substrates according to one or more embodiments may be selected from alkali-aluminosilicate glass, alkali-containing borosilicate glass, alkali-containing aluminoborosilicate glass, and alkali-containing phosphosilicate.

A "base composition" is a chemical make-up of a substrate prior to any ion exchange (IOX) treatment. That is, the base composition is undoped by any ions from IOX. A composition at the center of a glass-based article that has been IOX treated is typically substantially the same or similar to the base composition, as the IOX treatment conditions has minimal or no impact on the composition at the center of the substrate. In one or more embodiments, a composition at the center of the glass article comprises the base composition.

Reference to "in chemical equilibrium" means that any diffusion of two or more alkali ions of the base composition of the substrate or the central composition of the article is less than about 10% into the IOX bath.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue. Thus, for example, a glass-based article that is "substantially free of MgO" is one in which MgO is not actively added or batched into the glass-based article, but may be present in very small amounts as a contaminant, such as amounts less than 0.01 mol %. It should be understood that when a value is described using the modifier "about" the exact value is also intended to be disclosed. For example, "about 10 mol %" is intended to disclose the about modified value and the value of exactly 10 mol %.

Unless otherwise specified, all compositions described herein are expressed in terms of mole percent (mol %) on an oxide basis.

A "stress profile" is stress with respect to position of a glass-based article or any portion thereof. A compressive stress region extends from a first surface to a depth of compression (DOC) of the article, where the article is under compressive stress. A central tension region extends from the DOC to include the region where the article is under tensile stress.

As used herein, depth of compression (DOC) refers to the depth at which the stress within the glass-based article changes from compressive to tensile stress. At the DOC, the stress crosses from a positive (compressive) stress to a negative (tensile) stress and thus exhibits a stress value of zero. According to the convention normally used in mechanical arts, compression is expressed as a negative (<0) stress and tension is expressed as a positive (>0) stress. Throughout this description, however, compressive stress (CS) is expressed as a positive or absolute value—i.e., as recited herein, CS=|CS|. In addition, tensile stress is expressed herein as a negative (<0) stress or, in some situations where the tensile stress is specifically identified, as an absolute value. Central tension (CT) refers to tensile stress in a central region or central tension region of the glass-based article. Maximum central tension (maximum CT or $CT_{max}$) occurs in the central tension region, and often is located at 0.5·t, where t is the article thickness. Reference to "nominally" at 0.5·t allows for variation from exact center of the location of the maximum tensile stress.

A non-zero metal oxide concentration that varies from the first surface to a depth of layer (DOL) with respect to the metal oxide or that varies along at least a substantial portion of the article thickness (t) indicates that a stress has been generated in the article as a result of ion exchange. The variation in metal oxide concentration may be referred to herein as a metal oxide concentration gradient. The metal oxide that is non-zero in concentration and varies from the first surface to a DOL or along a portion of the thickness may be described as generating a stress in the glass-based article. The concentration gradient or variation of metal oxides is created by chemically strengthening a glass-based substrate in which a plurality of first metal ions in the glass-based substrate is exchanged with a plurality of second metal ions.

As used herein, the terms "depth of exchange", "depth of layer" (DOL), "chemical depth of layer", and "depth of chemical layer" may be used interchangeably, describing in general the depth at which ion exchange facilitated by an ion exchange process (IOX) takes place for a particular ion. DOL refers to the depth within a glass-based article (i.e., the distance from a surface of the glass-based article to its interior region) at which an ion of a metal oxide or alkali metal oxide (e.g., the metal ion or alkali metal ion) diffuses into the glass-based article where the concentration of the ion reaches a minimum value, as determined by Glow Discharge—Optical Emission Spectroscopy (GD-OES)). In some embodiments, the DOL is given as the depth of exchange of the slowest-diffusing or largest ion introduced by an ion exchange (IOX) process.

Unless otherwise specified, CT and CS are expressed herein in megaPascals (MPa), whereas thickness and DOC are expressed in millimeters or microns (micrometers).

CS and DOC are measured using those means known in the art, such as by scattering polarimetry using a SCALP-5 measurement system from Glasstress (Estonia). Other possible techniques for measuring CS and DOC include a surface stress meter (FSM) using commercially available instruments such as the FSM-6000, manufactured by Orihara Industrial Co., Ltd. (Japan). Surface stress measurements rely upon the accurate measurement of the stress optical coefficient (SOC), which is related to the birefringence of the glass. SOC in turn is measured according to those methods known in the art, such a Procedure C (Glass Disc Method) described in ASTM standard C770-16, entitled "Standard Test Method for Measurement of Glass Stress-Optical Coefficient," the contents of which are incorporated herein by reference in their entirety.

Disclosed herein are glass-based articles having improved stress profiles with higher stress values at moderate depths >0.005·t and <0.25·t where t is the thickness. Usually in lithium-based glass-based substrates, two ions, sodium (Na) and potassium (K), are used for diffusion and formation of a stress profile. K being an ion with larger ionic radius induces higher stress but is slow to diffuse in comparison the smaller ionic radius Na ion that induces lower stress. For that reason, inducing high stress at moderate depths can be challenging when using a mixed K/Na salt medium, such as a salt bath. Usually the K diffuses with the Na, and when the Na ions meet at the center of the glass substrate, it leads to the maximum stress. The K ions define what is called the spike of the profile and the Na ions the deep tail of the profile. After this point, further diffusion will lead to increase of K diffusion and the depth of the spike (known as DOL of the spike), but at the expense of modifying the ion content in the middle of the sample and further reducing tensile stress in the nominal center of the sample known as the center tension (CT). Longer diffusion times also lead to further reduction of other areas of the stress profile, as is the case of the region where the spike and the tail of the stress profile meet known as the stress at the knee (CSknee).

The present disclosure uses a modified concept for diffusion that decouples diffusion of potassium from diffusion of sodium using a unique "quasi-stoichiometric" diffusion step. With unique "quasi-stoichiometric" mediums, such as baths, it is possible to eliminate trade-offs associated with binary baths with respect to CS, CSknee, CT, and DOL. The term "bath" is utilized herein to refer to the ion exchange medium, but it is understood that the ion exchange could be conducted utilizing any appropriate medium, such as creams, pastes, and/or coatings. It is demonstrated that there are certain salt concentrations of an IOX bath where potassium at different concentrations can be used to diffuse inside the glass-based substrates. This while keeping the concentration of ions originally present inside the substrates (base composition) substantially unchanged, as ions of the base composition, e.g., sodium and lithium, are in chemical equilibrium with the IOX bath for the sodium and lithium ions.

This modified quasi-stoichiometric IOX allows the diffusion of potassium in a first step for a very long time without major changes to the base composition of the interior of the glass-based substrate. The glass-based substrate is only changed near the immediate surface where the potassium is diffusing.

This initial quasi-stoichiometric step can be followed with multiple other traditional IOX conditions with pure or poisoned baths. Non-limiting examples of other traditional IOX processes in which glass-based substrates are immersed in multiple ion exchange baths, with washing and/or annealing steps between immersions, are described in U.S. Pat. No. 8,561,429, by Douglas C. Allan et al., issued on Oct. 22, 2013, entitled "Glass with Compressive Surface for Consumer Applications," in which glass is strengthened by immersion in multiple, successive, ion exchange treatments in salt baths of different concentrations; and U.S. Pat. No. 8,312,739, by Christopher M. Lee et al., issued on Nov. 20, 2012, and entitled "Dual Stage Ion Exchange for Chemical Strengthening of Glass," in which glass is strengthened by ion exchange in a first bath diluted with an effluent ion, followed by immersion in a second bath having a smaller concentration of the effluent ion than the first bath. The contents of U.S. Pat. Nos. 8,561,429 and 8,312,739 are incorporated herein by reference in their entireties.

The stress profiles achieved by the methods disclosed herein are unique and difficult if not impossible to be achieved by other means. A signature of the glass-based articles is the presence of a certain amount of potassium at depth that generates higher stress values at depths in the range of >0.00625·t and <0.25·t; or >0.009375·t and <0.21·t; or >0.01·t and <0.10·t; or >0.005·t and <0.05·t, and all values and subranges therebetween.

Stress profiles may comprise: a spike region extending from the first surface to a transition region; a transition region extending to a tail region; and a tail region extending to a center of the glass-based article; wherein all points of the stress profile located in the spike region comprise a tangent having an absolute value that is 20 MPa/micrometer or greater, all points of the stress profile located in the transition region comprise a tangent having an absolute value that is less than 20 MPa/micrometer, and all points of the stress profile located in the tail region comprise a tangent having an absolute value that is less than the absolute values of the tangents of the transition region.

Glass-based articles disclosed herein are advantageous in that they have superior drop performance. Glass-based articles also have superior edge impact performance due to the unique nature of the ionic distribution and stress distribution inside the glass-based article. Gain in edge impact performance is achieved while keeping a significant overall drop performance. These parameters are desirable with respect to, for example, performance of 2½ D and 3D phone designs.

Methods according to this disclosure allow for diffusion in the immediate surface of a glass-based substrate without changing the inside ion content (base composition) with the use of a mixed bath. CSknee is decoupled from DOL of the K spike in a lithium-containing glass-based substrate. Glass-based articles may be formed where there is not a knee. Unique stress profiles using ions with very different diffusivities may be created. For example, ions other than potassium (K) or whatever ion is not part of the original glass composition, e.g. Rb, CS, Ag, Au, etc. . . . , may be readily incorporated into glass-based article designs. Further, in addition to Li-containing glass-based substrates typically used in IOX, other non-Li glass-based substrates are suitable for the methods herein. Moreover, the methods can be easily implemented in manufacturing using current systems and with new modified IOX baths.

In the glass-based articles, there is a metal oxide, different from two alkali metal oxides of a glass-based substrate's base composition, having a non-zero concentration that varies from the first surface to a depth of layer (DOL) with respect to the metal oxide. I embodiments, the base composition may include more than two alkali metal oxides that are different than the metal oxide. A stress profile is generated due to the non-zero concentration of the metal oxide(s) that varies from the first surface. The non-zero concentration may vary along a portion of the article thickness. In some embodiments, the concentration of the metal oxide, different from two or more alkali metal oxides of the base composition, is non-zero and varies, along a thickness range from 0·t to about 0.3·t. In some embodiments, the concentration of the metal oxide is non-zero and varies along a thickness range from 0·t to about 0.35·t, from 0·t to about 0.4·t, from 0·t to about 0.45·t, from 0·t to about 0.48·t, or from 0·t to about 0.50·t. The variation in concentration may be continuous along the above-referenced thickness ranges. Variation in concentration may include a change in metal oxide concentration of about at least about 0.2 mol % along a thickness segment of about 100 micrometers. The change in metal oxide concentration may be at least about 0.3 mol %, at least about 0.4 mol %, or at least about 0.5 mol % along a thickness segment of about 100 micrometers. This change may be measured by known methods in the art including microprobe.

In some embodiments, the variation in concentration may be continuous along thickness segments in the range from about 10 micrometers to about 30 micrometers. In some embodiments, the concentration of the metal oxide decreases from the first surface to a point between the first surface and the second surface and increases from that point to the second surface.

The concentration of metal oxide may include more than one metal oxide (e.g., a combination of $Na_2O$ and $K_2O$). In some embodiments, where two metal oxides are utilized and where the radius of the ions differ from one or another, the concentration of ions having a larger radius is greater than the concentration of ions having a smaller radius at shallow depths, while at deeper depths, the concentration of ions having a smaller radius is greater than the concentration of ions having larger radius. For example, where a single Na- and K-containing bath is used in the ion exchange process, the concentration of K+ ions in the glass-based article is greater than the concentration of Na+ ions at shallower depths, while the concentration of Na+ is greater than the concentration of K+ ions at deeper depths. This is due, in part, to the size of the monovalent ions that are exchanged into the glass for smaller monovalent ions. In such glass-based articles, the area at or near the surface comprises a greater CS due to the greater amount of larger ions (i.e., K+ ions) at or near the surface. Furthermore, the slope of the stress profile typically decreases with distance from the surface due to the nature of the concentration profile achieved due to chemical diffusion from a fixed surface concentration.

In one or more embodiments, the metal oxide concentration gradient extends through a substantial portion of the thickness t of the article. In some embodiments, the concentration of the metal oxide may be about 0.5 mol % or greater (e.g., about 1 mol % or greater) along the entire thickness of the first and/or second section, and is greatest at a first surface and/or a second surface 0·t and decreases substantially constantly to a point between the first and second surfaces. At that point, the concentration of the metal oxide is the least along the entire thickness t; however the concentration is also non-zero at that point. In other words, the non-zero concentration of that particular metal oxide extends along a substantial portion of the thickness t (as described herein) or the entire thickness t. The total concentration of the particular metal oxide in the glass-based article may be in the range from about 1 mol % to about 20 mol %.

The concentration of the metal oxide may be determined from a baseline amount of the metal oxide in the glass-based substrate ion exchanged to form the glass-based article.

Figure 1B:
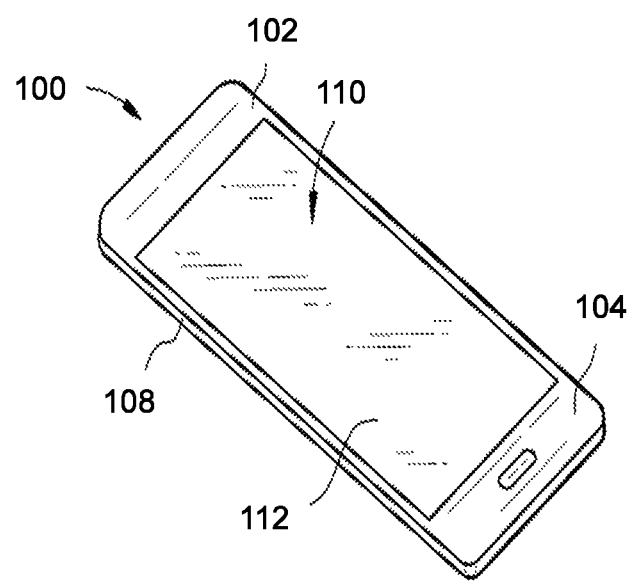
FIG. 1B is a perspective view of the exemplary electronic device of FIG. 1A.

The glass-based articles disclosed herein may be incorporated into another article such as an article with a display (or display articles) and/or a housing (e.g., consumer electronics, including mobile phones, tablets, computers, navigation systems, and the like), architectural articles, transportation articles (e.g., automobiles, trains, aircraft, seacraft, etc.), appliance articles, or any article that requires some transparency, scratch-resistance, abrasion resistance or a combination thereof. An exemplary article incorporating any of the glass-based articles disclosed herein is shown in FIGS. 1A and 1B. Specifically, FIGS. 1A and 1B show a consumer electronic device 100 including a housing 102 having front 104, back 106, and side surfaces 108; electrical components (not shown) that are at least partially inside or entirely within the housing and including at least a controller, a memory, and a display 110 at or adjacent to the front surface of the housing; and a cover plate 112 at or over the front surface of the housing such that it is over the display. In some embodiments, the at least a portion of cover plate 112 may include any of the glass-based articles disclosed herein. In some embodiments, at least a portion of the housing 102 may include any of the glass-based articles disclosed herein.

Glass-based substrates may be provided using a variety of different processes. For example, exemplary glass-based substrate forming methods include float glass processes and down-draw processes such as fusion draw and slot draw. A glass-based substrate prepared by floating molten glass on a bed of molten metal, typically tin to produce a float glass characterized by smooth surfaces and uniform thickness. In an example process, molten glass that is fed onto the surface of the molten tin bed forms a floating glass ribbon. As the glass ribbon flows along the tin bath, the temperature is gradually decreased until the glass ribbon solidifies into a solid glass-based substrate that can be lifted from the tin onto rollers. Once off the bath, the glass-based substrate can be cooled further, annealed to reduce internal stress, and optionally polished.

Down-draw processes produce glass-based substrates having a uniform thickness that possess relatively pristine surfaces. Because the average flexural strength of the glass-based substrate is controlled by the amount and size of surface flaws, a pristine surface has a higher initial strength. When this high strength glass-based substrate is then further strengthened (e.g., chemically), the resultant strength can be higher than that of a glass-based substrate with a surface that has been lapped and polished. Down-drawn glass-based substrates may be drawn to a thickness of less than about 2 mm. In addition, down drawn glass-based substrates have a very flat, smooth surface that can be used in its final application without costly grinding and polishing.

The fusion draw process, for example, uses a drawing tank that has a channel for accepting molten glass raw material. The channel has weirs that are open at the top along the length of the channel on both sides of the channel. When the channel fills with molten material, the molten glass overflows the weirs. Due to gravity, the molten glass flows down the outside surfaces of the drawing tank as two flowing glass films. These outside surfaces of the drawing tank extend down and inwardly so that they join at an edge below the drawing tank. The two flowing glass films join at this edge to fuse and form a single flowing glass-based substrate. The fusion draw method offers the advantage that, because the two glass films flowing over the channel fuse together, neither of the outside surfaces of the resulting glass-based substrate comes in contact with any part of the apparatus. Thus, the surface properties of the fusion drawn glass-based substrate are not affected by such contact.

The slot draw process is distinct from the fusion draw method. In slot draw processes, the molten raw material glass is provided to a drawing tank. The bottom of the drawing tank has an open slot with a nozzle that extends the length of the slot. The molten glass flows through the slot/nozzle and is drawn downward as a continuous substrate and into an annealing region.

Exemplary base compositions of substrates may comprise but are not limited to: an alkali-alumino silicate, an alkali-containing borosilicate, an alkali-containing aluminoborosilicate, or an alkali-containing phosphosilicate. Glass-based substrates may include a lithium-containing aluminosilicate.

Examples of glasses that may be used as substrates may include alkali-alumino silicate glass compositions or alkali-containing aluminoborosilicate glass compositions, though other glass compositions are contemplated. Such glass compositions may be characterized as ion exchangeable. As used herein, "ion exchangeable" means that a substrate comprising the composition is capable of exchanging cations located at or near the surface of the substrate with cations of the same valence that are either larger or smaller in size.

In a particular embodiment, an alkali-alumino silicate glass composition suitable for the substrates comprises alumina, at least one alkali metal and, in some embodiments, greater than 50 mol. % $SiO_2$, in other embodiments at least 58 mol. % $SiO_2$, and in still other embodiments at least 60 mol. % $SiO_2$, wherein the ratio (($Al_2O_3$+$B_2O_3$)/modifiers) >1, where in the ratio the components are expressed in mol. % and the modifiers are alkali metal oxides. This glass composition, in particular embodiments, comprises: 58-72 mol. % $SiO_2$; 9-17 mol. % $Al_2O_3$; 2-12 mol. % $B_2O_3$; 8-16 mol. % $Na_2O$; and 0-4 mol. % $K_2O$, wherein the ratio (($Al_2O_3$+$B_2O_3$)/Σmodifiers)>1.

In still another embodiment, the substrates may include an alkali aluminosilicate glass composition comprising: 64-68 mol. % $SiO_2$; 12-16 mol. % $Na_2O$; 8-12 mol. % $Al_2O_3$; 0-3 mol. % $B_2O_3$; 2-5 mol. % $K_2O$; 4-6 mol. % MgO; and 0-5 mol. % CaO, wherein: 66 mol. %<($SiO_2$+$B_2O_3$+CaO)<69 mol. %; ($Na_2O$+$K_2O$+$B_2O_3$+MgO+CaO+SrO)>10 mol. %; 5 mol. %<(MgO+CaO+SrO)<8 mol. %; ($Na_2O$+$B_2O_3$)−$Al_2O_3$<2 mol. %; 2 mol. %<$Na_2O$−$Al_2O_3$<6 mol. %; and 4 mol. %<($Na_2O$+$K_2O$)−$Al_2O_3$<10 mol. %.

In an alternative embodiment, the substrates may comprise an alkali aluminosilicate glass. In an embodiment, the alkali aluminosilicate glass has a composition comprising: 2 mol. % or more of $Al_2O_3$ and/or $ZrO_2$, or 4 mol % or more of $Al_2O_3$ and/or $ZrO_2$.

In another embodiment, the substrates may comprise a lithium-containing alkali aluminosilicate glass. In an embodiment, the lithium-containing alkali aluminosilicate glass has a composition including, in mol %, $SiO_2$ in an amount in the range from about 60% to about 75%, $Al_2O_3$ in an amount in the range from about 12% to about 20%, $B_2O_3$ in an amount in the range from about 0% to about 5%, $Li_2O$ in an amount in the range from about 2% to about 8%, $Na_2O$ in an amount greater than about 4%, MgO in an amount in the range from about 0% to about 5%, ZnO in an amount in the range from about 0% to about 3%, CaO in an amount in the range from about 0% to about 5%, and $P_2O_5$ in a non-zero amount; wherein the glass substrate is ion-exchangeable and is amorphous, wherein the total amount of $Al_2O_3$ and $Na_2O$ in the composition is greater than about 15 mol %.

Chemical strengthening of glass substrates having base compositions is done by placing the ion-exchangeable glass substrates in a molten bath containing cations (K+, Na+, Ag+, etc) that diffuse into the glass while the smaller alkali ions (Na+, Li+) of the glass diffuse out into the molten bath. The replacement of the smaller cations by larger ones creates compressive stresses near the top surface of glass. Tensile stresses are generated in the interior of the glass to balance the near-surface compressive stresses. For a flat piece of glass of uniform thickness, stress ($\sigma(z)$) can be calculated from the concentration profile of a diffused-in ion according to equation (I):

$$\sigma(z) = \frac{BE}{1-v}(C_{avg} - C(z)) = \frac{BE}{1-v}\left(\frac{1}{h}\int_0^h C(z)dz - C(z)\right). \quad (I)$$

where $C(z)$ is the concentration of cations of one diffused-in type at z, $C_{avg}$ is the average concentration of the cation type in the article, h is the glass thickness, B is the network dilation coefficient, E is the Young's modulus, v is the Poisson's ratio, and z is the co-ordinate in the thickness direction with values 0 and h at the surfaces of the article. Concentration of the diffused-in ions is typically maximum at the surface and minimum at the mid-thickness. Near the surface, where $C(z)>C_{avg}$, stresses are compressive. When $C(z)=C_{avg}$, stress becomes zero, and this depth is referred to as the depth of compression (DOC). At greater depths, where $C(z)<C_{avg}$, stresses are tensile, and generally reach a maximum value at the mid-thickness of the article. This maximum value of tensile stress is referred to as the maximum central tension. For multiple types of diffused-in ions, the overall stress becomes the summation of equation (I) as applied to each type of ion.

Figure 2:
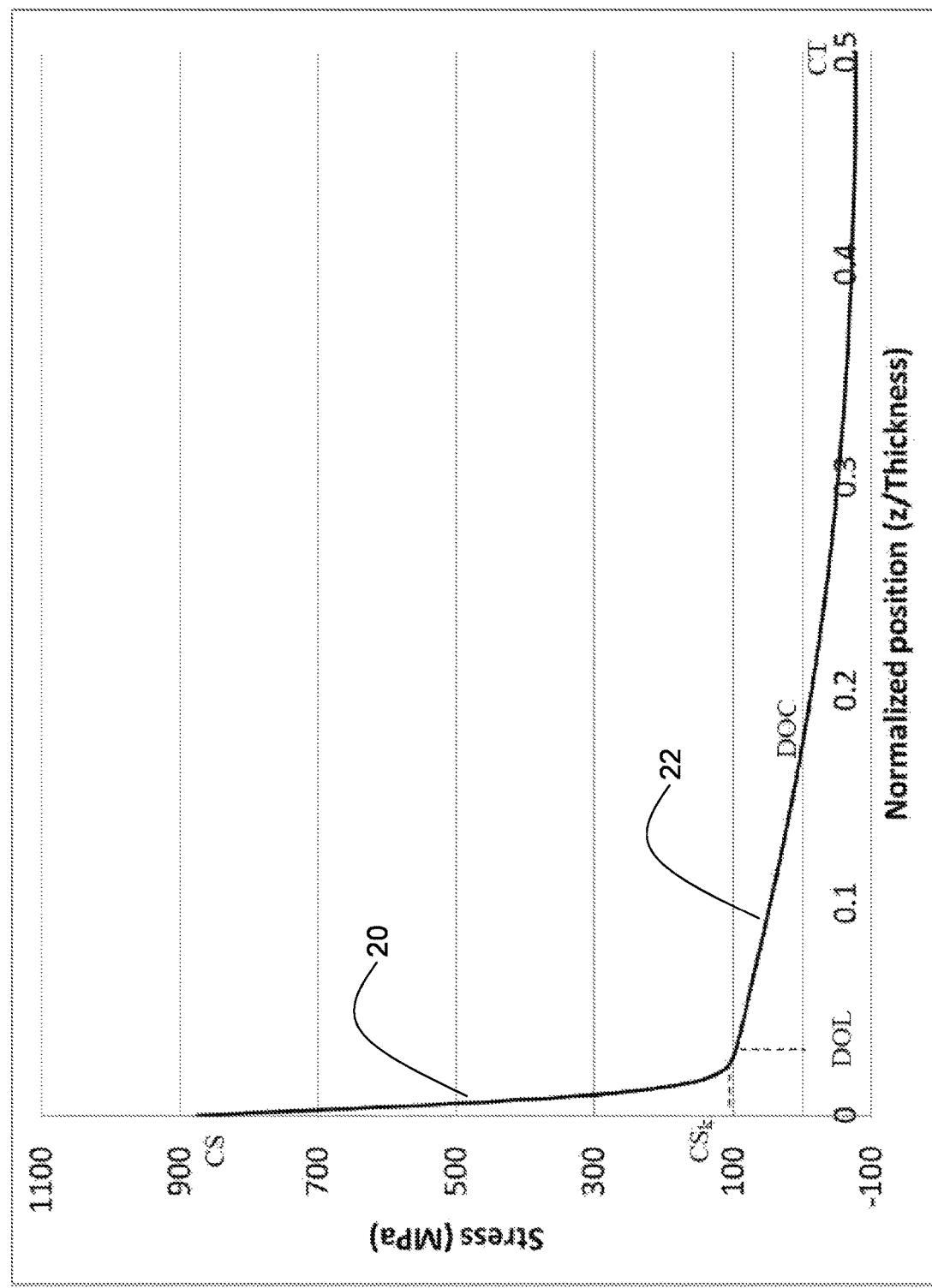
FIG. 2 is a graph based on diffusion modeling of stress (MPa) versus normalized position (z/thickness) of a prior art a glass-based article.

FIG. 2 is a graph of stress (MPa) versus normalized position (z/thickness) of a prior art a glass-based article, which was generated using a two-dimensional (2D) plane strain ion exchange (IOX) model, which is based on finite difference modeling. In the particular case where there are at least three ions present that can be exchanged, either in the bath and/or in the base composition simultaneously, stress profiles may have a dual slope region with a single ion exchange. A case of interest includes glass-based substrates that contain lithium in their base compositions, although the present disclosure is not restricted to lithium-based glass substrates. A typical glass containing lithium in its composition can exchange the lithium with all other alkaline metal components (Na, K, Rb, Cs, Fr) and some metallic ions (Ag, Cu, Au, etc. . . . ) and lead to a compressive stress increase in the near surface. This is due to that lithium is the element with the smallest ionic radius amongst these elements. Usually, but not always, the diffusion coefficient also follows the ionic radius of the elements. Therefore, an exchange of Na for Li is significantly faster than K for Li. Here, K, Na and Li are the most common alkali metal elements utilized in ion exchange. The large difference in diffusion coefficients leads to the appearance of two regions in the stress profile when using a mixed bath with K/Na content exchanging a glass that contains Li (and perhaps other elements like some Na).

Figure 3:
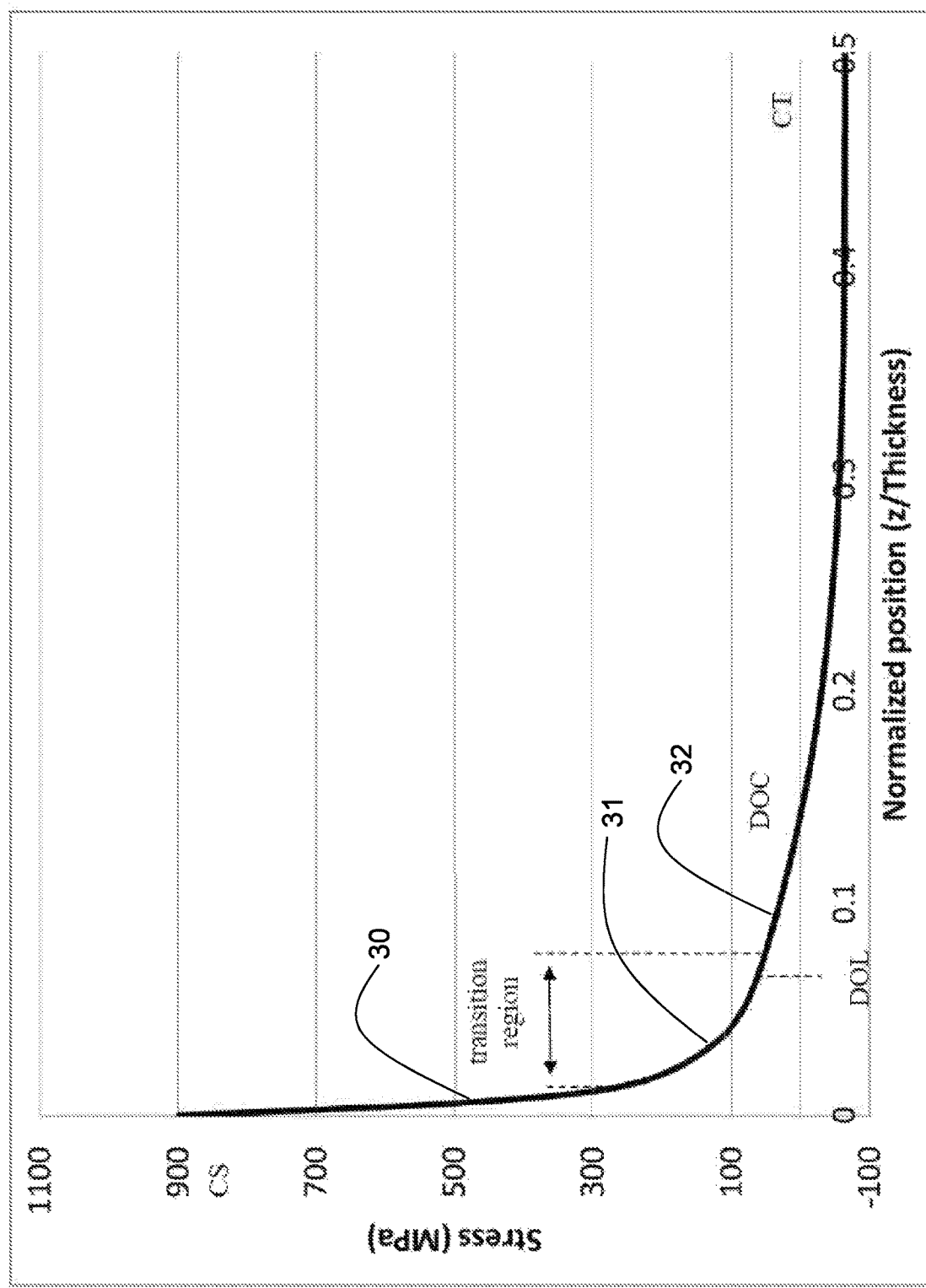
FIG. 3 is a graph based on diffusion modeling of stress (MPa) versus normalized position (z/thickness) of a glass-based article according to an embodiment.

Turning to FIGS. 2-3, an underlying glass-based substrate had the following base composition: 63.60 mol % $SiO_2$, 15.67 mol % $Al_2O_3$, 10.81 mol % $Na_2O$, 6.24 mol % $Li_2O$, 1.16 mol % ZnO, 0.04 mol % $SnO_2$, and 2.48 mol % $P_2O_5$ This composition has a normalized Na content of 62 mol % and Li content of 38 mole %. The graphs of FIGS. 2-3 were generated using a two-dimensional (2D) plane strain ion exchange (IOX) model, which is based on finite difference modeling.

The graph of FIG. 2 represents a typical stress profile of a Li-containing prior art glass-based article, that was subject to a traditional IOX treatment step that used a binary bath composition (K/Na) that was designed to impart desired stress based on diffusion of potassium and sodium ions into the glass-substrate but no ions of Li were present in the bath composition, which means the bath composition was not in chemical equilibrium with the Na and Li metals of the underlying glass-based substrate. In FIG. 2, the typical stress profile contained a spike region 20 near the surface and a tail region 22 deeper inside the article. Stress at the surface is referred to as CS (either compressive or tensile); depth of layer (DOL) of the spike region 20 is related to diffusion depth of diffused-in ions near the spike, stress of a knee CSk (either compressive or tensile) is the stress at an asymptotic extrapolation of the spike and tail regions; depth of compression (DOC) is the location where stress is first zero inside the article and changes sign from compression to tensile (or vice-versa); and center tension (CT) is stress (either tensile or compressive) at the center or nominal center of the article. The convention herein is that compressive stress is positive and tensile is negative for illustration purposes.

FIG. 3 is a graph of stress (MPa) versus normalized position (z/thickness) of a glass-based article according to an embodiment that was subject to: a first IOX treatment step, in which a 3-ion bath composition of the IOX treatment step was designed to impart desired ions into a glass-substrate, and Na and Li ions of the bath composition were in chemical equilibrium with respective metals of the underlying glass-based substrate; and to another IOX treatment step whose bath composition was not in chemical equilibrium comparable to the traditional IOX treatment step discussed with respect to FIG. 2. In FIG. 3, the inventive stress profile contained a spike region 30 near the surface, a transition region 31, which was gradual and eliminated the knee found in FIG. 2, and a tail region 32 deeper inside the article. Analogous to FIG. 2, there are: CS, which is stress at the surface, DOL of the spike region 30, which is related to diffusion depth of diffused-in ions near the spike, DOC, which is the location where stress is first zero inside the article and changes sign from compression to tensile (or vice-versa); and CT, which is stress (either tensile or compressive) at the center or nominal center of the article. In contrast to FIG. 2, transition region 31 connects the spike region 30 with the tail region 32. That is, a main difference between the traditional profile of FIG. 2 and the new profile in FIG. 3 is the appearance of a wider transition region. It is difficult to pinpoint a particular asymptotic point where the transition or knee point between the spike and tail of the profile occurs. This is due to the quasi-stoichiometric diffusion of potassium (or other ion of choice not present in the glass) used in the unique quasi-stoichiometric IOX step disclosed herein.

In FIG. 3, all points of the stress profile located in the spike region comprise a tangent having an absolute value that is 20 MPa/micrometer or greater, all points of the stress profile located in the transition region comprise a tangent having an absolute value that is less than 20 MPa/micrometer, and all points of the stress profile located in the tail region comprise a tangent having an absolute value that is less than the absolute values of the tangents of the transition region. In one or more embodiments, compressive stresses at greater than or equal to about 0.00625·t depth from the first surface are at least about 150 MPa. In one or more embodiments, compressive stresses at greater than or equal to about 0.025·t depth from the first surface are at least about 120 MPa. In one or more detailed embodiments, a first compressive stress is located between about 5 to 10 micrometers depth from the first surface and is in the range of about 150 MPa to about 300 MPa, and/or the second compressive stress is located between about 15 to 20 micrometers depth from the first surface and is in the range of about 120 MPa to about 240 MPa In a mixed bath, e.g., two or three or more types of ions, molar content of the bath is not necessarily the molar content at a first or second surface, referred to herein as "surface boundary," of the resulting article. This is widely known and it is due to the thermodynamic equilibrium during the ion exchange of the ions in the bath and the ions in the surface of the glass. Usually, in order to achieve a certain amount of molar content of ions in a surface of an article, experiments are carried out and the elemental distribution of ions inside the glass (including the surface boundary) is assessed via microprobe or GDOES (glow discharge optical emission spectroscopy). The amount of ions in the surface boundary is a function of the base composition of the underlying glass-based substrate. Therefore different glass-based substrates will behave differently under the same bath conditions.

The difference between the molar content of ions in the bath versus the surface boundary is already quite complicated for a two-ion species diffusion. In a lithium based glass this gets more complicated when there are three-ion species available for diffusion. Therefore, an approach is to experimentally find what conditions in the bath lead to respective desired diffusion conditions in the glass.

To begin the analysis to reach quasi-stoichiometric conditions, the original molar balance of the base composition is assessed. For FIG. 3, the molar ratio was 0.62/0.38 which is ~1.63. Then, this molar ratio is adopted as the goal for the surface boundary. Molar or weight content in the bath may be different, however, and it to be found experimentally, with the result leading to, in this example, a ratio of Na/Li~1.63. For example if it is desired to have 22 mol % K at the surface boundary, the rest of the x Na ions and y Li would be represented by the equation: $x(Na)+y(Li)+0.22(K)=1$, which simplifies to $x(Na)+y(Li)=0.78$. For the representative base composition, $x(Na)/y(Li)\sim1.63$, or $x(Na)=1.63y$ (Li). Therefore, $1.63y(Li)+y(Li)=0.78$, and $y(Li)=0.78/2.63=0.30$, which leads to $x(Na)=1-0.22-0.30=\sim0.48$. An exemplary set of conditions that can lead to a quasi-stoichiometric diffusion is 22 mol % K/48 mol % Na/30 mol % Li in the surface boundary of a base glass that has in its interior already a stoichiometric ratio of Na/Li~1.63, which is demonstrated in Example 1, FIGS. 9A-9B discussed hereafter.

It is understood that there are uncertainties in practical terms as most of the chemicals used are not completely pure and there are impurities also in glasses, although at much smaller levels. It is also understood that there a limitations to diffusion keeping exactly the same base composition under long diffusion times, but are expected to be within 10%, or within a range of ±10 mol %, or ±5 mol %, or even ±1 mol %, and all values and subranges therebetween, of the base composition.

Figure 4:
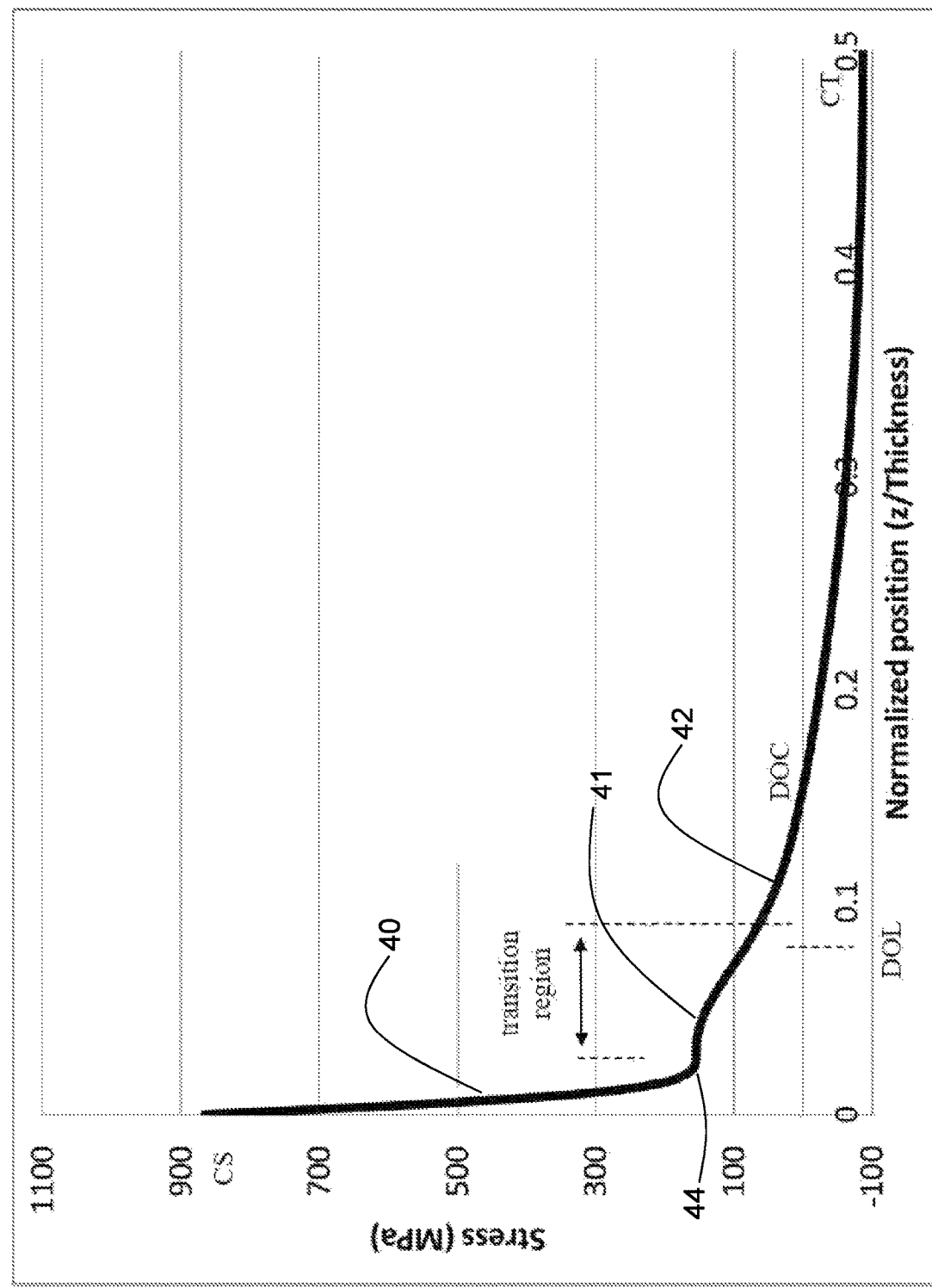
FIG. 4 is a graph based on diffusion modeling of stress (MPa) versus normalized position (z/thickness) of a glass-based article according to an embodiment.

FIG. 4 is a graph of stress (MPa) versus normalized position (z/thickness) of a glass-based article according to an embodiment that was subject to an IOX treatment step in which a 3-ion bath composition of the IOX treatment step was designed to impart desired ions into a glass-substrate and Na and Li ions of the bath composition were in chemical equilibrium with respective metals of the underlying glass-based substrate followed by one or more IOX steps, traditional (dual ion) and/or quasi-stoichiometric. In FIG. 4, the inventive stress profile contained a spike region 40 near the surface, a transition region 41, which was gradual, a hump, and a tail region 42 deeper inside the article. Analogous to FIG. 3, there are: CS, which is stress at the surface, DOL of the spike region 40, which is related to diffusion depth of diffused-in ions near the spike, DOC, which is the location where stress is first zero inside the article and changes sign from compression to tensile (or vice-versa); and CT, which is stress (either tensile or compressive) at the center or nominal center of the article. Different from FIG. 2 is the absence of a knee region. Different from FIG. 3 is the presence of a hump in the transition region that results from one or more subsequent IOX treatments, including traditional and/or quasi-stoichiometric treatments.

Glass-based substrates used herein have a base composition and are subject to IOX treatment, which introduces a metal oxide, different from two or more alkali metal oxides of the base composition. In one or more embodiments, glass-based substrates may comprise an alkali-alumino silicate, an alkali-containing borosilicate, an alkali-containing aluminoborosilicate, or an alkali-containing phosphosilicate. Alkali metals include: lithium, sodium, potassium, rubidium, and cesium. The base composition may comprise the metal oxide different from the two or more alkali metal oxides of the base composition in an amount of less than 1 mol %, less than 0.5 mol %, less than 0.1 mol %, or less including all values and subranges therebetween. The metal oxide different from the two or more alkali metal oxides of the base composition may be selected from the group consisting of: lithium (Li), sodium (Na), potassium (K), rubidium (Rb), cesium (Cs), francium (Fr), silver (Ag), gold (Au), copper (Cu), and combinations thereof. In one or more embodiments, the two or more alkali metal oxides of the base composition comprise lithium and sodium, and the metal oxide different from the two or more alkali metal oxides of the base composition is potassium. In one or more embodiments, the glass-based substrates have a thickness t in the range of from 50 micrometers to 5 millimeters, and all values and subranges therebetween.

Glass-based substrates may be exposed to one "quasi-stoichiometric" IOX treatment with optional additional strengthening treatments. In an embodiment, a glass-based substrate that contains two or more alkali metal oxides in a base composition is exposed to an ion exchange treatment to form a glass-based article. The ion exchange treatment utilizes a bath comprising first metal ions that are different from the two or more alkali metals of the alkali metal oxides in the base composition; and ions of the two or more alkali metals of the two or more alkali metal oxides in the base composition in a ratio such that ions of each alkali metal are in chemical equilibrium with each of the respective alkali metals of the alkali metal oxides in the base glass composition. Further additional strengthening treatments may be selected from the group consisting of: ion exchange, thermal annealing, and combinations thereof.

In one or more embodiments, a glass-based article formed by exposure to one "quasi-stoichiometric" IOX treatment comprises: a glass-based substrate having opposing first and second surfaces defining a substrate thickness (t); a central composition at the center of the glass-based article containing two or more alkali metal oxides, a surface concentration of each of the two or more alkali metal oxides being non-zero at one or both of the first and second surfaces; a metal oxide, different from the two or more alkali metal oxides of the central composition, having a non-zero concentration that varies from the first surface to a depth of layer (DOL) with respect to the metal oxide; wherein at thicknesses deeper than about three times the DOL, a concentration of each of the two or more alkali metal oxides is within 10% of a respective concentration of each of the two or more alkali metal oxides in the central composition. By using an IOX bath whose ions, for example, lithium and sodium, are in chemical equilibrium with the respective metals in the base composition, potassium is diffused into the substrate while the base composition with respect to lithium and sodium remains substantially (e.g., within 10%) the same.

One or more detailed embodiments provide that the concentration of each of the two or more alkali metal oxides in the glass-based article at thicknesses deeper than about three times the DOL is ±5%, ±4%, ±3%, ±2%, ±1%, ±0.5%, ±0.25%, ±0.10% and all values therebetween of the respective concentration of each of the two or more alkali metal oxides in the base composition of the substrate or the central composition of the article. One or more detailed embodiments provide that at the first surface, the surface concentration of each of the two or more alkali metal oxides are ±5%±4%, ±3%, ±2%, ±1%, ±0.5%, ±0.25%, ±0.10% and all values therebetween of the respective concentration of each of the two or more alkali metal oxides in the base composition or the central composition.

Glass-based substrates may be exposed to one "quasi-stoichiometric" IOX treatment, a second traditional IOX treatment, and one or more optional additional strengthening treatments. In an embodiment, a glass-based substrate that contains two or more alkali metal oxides in a base composition is exposed to a first ion exchange treatment to form a doped glass-based substrate. The first ion exchange treatment utilizes a bath comprising first metal ions that are different from the two or more alkali metals of the alkali metal oxides in the base composition; and ions of the two or more alkali metals of the two or more alkali metal oxides in the base composition in a ratio such that ions of each alkali metal are in chemical equilibrium with each of the respective alkali metals of the alkali metal oxides in the base glass composition. As utilized herein, a "doped glass-based substrate" refers to a substrate that has been altered to include additional ions of the first metal ions as a result of the first ion exchange treatment. The doped glass-based substrate is then exposed to a second ion exchange treatment including a second bath comprising second metal ions to form the glass-based article. Further additional strengthening treatments may be selected from the group consisting of: ion exchange, thermal annealing, and combinations thereof. The second and any subsequent ion exchange treatments may be utilized to tailor the glass-article's final stress profile to a desired application.

In an embodiment, the second bath comprises: the ions of the two or more alkali metals of the two or more alkali metal oxides in the base composition in a ratio such that ions of each alkali metal oxide are in chemical equilibrium with each of the respective alkali metals of the alkali metal oxides in the base glass composition; wherein the second metal ions are different from the two or more alkali metals in the base glass composition; and wherein beyond three times a depth of layer (DOL) with respect to the second metal ions, a concentration of each of the two or more alkali metals is within 10% of a respective concentration of each of the two or more alkali metal oxides in the base composition.

In an embodiment, the second bath comprises: the ions of the two or more alkali metals of the two or more alkali metal oxides in the base composition in a ratio such that ions of each alkali metal oxide are not in chemical equilibrium with each of the respective alkali metals of the alkali metal oxides in the base glass composition; wherein the second metal ions are different from two or more alkali metals of the two or more alkali metal oxides in the base glass composition; and wherein beyond three times a depth of layer (DOL) with respect to the second metal ions, a concentration of each of the two or more alkali metals is more than 10% different from a respective concentration of each of the two or more alkali metal oxides in the base composition.

In one or more embodiments, a glass-based article formed by exposure to both a "quasi-stoichiometric" IOX treatment and a second treatment comprises: a glass-based substrate having opposing first and second surfaces defining a substrate thickness (t); a central composition at the center of the glass-based article containing two or more alkali metal oxides; a surface concentration of each of the two or more alkali metal oxides being non-zero at one or both of the first and second surfaces, a metal oxide, different from the two or more alkali metal oxides of the central composition, having a non-zero concentration that varies from the first and second surfaces to a depth of layer (DOL) of the metal oxide; and a stress profile comprising: a spike region extending from the first surface to a transition region; the transition region extending to a tail region; and the tail region extending to a center of the glass-based article; wherein the transition region comprises a first compressive stress at greater than or equal to about 0.00625·t depth from the first surface is at least about 150 MPa, and a second compressive stress at greater than or equal to about 0.025·t depth from the first surface is at least about 120 MPa.

The first compressive stress may be located between about 5 and about 10 micrometers, and all values and subranges therebetween, depth from the first surface and has a value in the range of about 150 MPa to about 300 MPa, and all values and subranges therebetween. The second compressive stress may be located between about 15 and about 20 micrometers depth, and all values and subranges therebetween, from the first surface and has a value in the range of about 120 MPa to about 240 MPa, and all values and subranges therebetween.

A depth of compression (DOC) may be greater than or equal to 0.13·t, or 0.15·t, or 0.17·t, or 0.21·t, or 0.23·t, or 0.25·t, or deeper. In one or more detailed embodiments, for a substrate thickness t of less than or equal to 400 micrometers, the DOC is greater than or equal to 0.13·t. In one or more detailed embodiments; for a substrate thickness t of greater than 400 micrometers to less than 800 micrometers, the DOC is greater than or equal to 0.17·t; and for a substrate thickness t of greater than or equal to 800 micrometers, the DOC is greater than or equal to 0.18·t, or greater than or equal to 0.19·t.

In one or more embodiments, all points of the stress profile located in the spike region comprise a tangent having an absolute value that is 20 MPa/micrometer or greater.

In one or more embodiments, all points of the stress profile located in the transition region comprise a tangent having an absolute value that is less than 20 MPa/micrometer and greater than absolute values of tangents of all points of the stress profile located in the tail region.

In one or more embodiments, all points of the stress profile located at a depth of about 15 micrometers to about 20 micrometers are less than 20 MPa/micrometer and greater than 2.0 MPa/micrometer, and all values and subranges therebetween.

A surface compressive stress (CS) at the first surface may be 400 MPa or greater. CS may be in the range of 400 MPa to 1.2 GPa, 700 MPa to 950 MPa, or about 800 MPa, and all values and subranges therebetween.

In one or more embodiments, a glass-based article utilizing a lithium-based glass-based substrate exposed to both a "quasi-stoichiometric" IOX treatment and a second treatment comprises: a glass-based substrate having opposing first and second surfaces defining a substrate thickness (t); a central composition at the center of the glass-based article containing lithium and one or more additional alkali metal oxides; a surface concentration of each of the lithium and the one or more additional alkali metal oxides being non-zero at one or both of the first and second surfaces; a metal oxide, different from lithium and the one or more additional alkali metal oxides of the central composition, having a non-zero concentration that varies from the first and second surfaces to a depth of layer (DOL) of the metal oxide; a depth of compression (DOC) that is greater than or equal to about 0.13·t; and a first compressive stress at from about 5 micrometers to 10 micrometers depth from the first surface is at least 150 MPa, and a second compressive stress at from about 15 micrometers to about 20 micrometers depth from the first surface is at least 120 MPa.

In an embodiment, at a depth of 3 to 10 micrometers or more, a concentration of the metal oxide different from the lithium and the one or more additional alkali metal oxides of the central composition may be 5% by weight or more of all alkali metals in the glass-based article. In an embodiment, the metal oxide different from the two or more alkali metal oxides of the central composition is potassium and the depth is 10 micrometers. In an embodiment, the metal oxide different from the lithium and the one or more additional alkali metal oxides of the central composition is rubidium, cesium, or francium, and the depth is 3 micrometers.

In an embodiment, at a depth of 20 micrometers or more a concentration of the metal oxide different from the lithium and the one or more additional alkali metal oxides of the central composition is 0.3% by weight or more of all alkali metals in the glass-based article. In an embodiment, the metal oxide different from the lithium and the one or more additional alkali metal oxides of the central composition is silver, gold, or copper.

EXAMPLES

Various embodiments will be further clarified by the following examples. In the Examples, prior to strengthening, the Examples are referred to as "substrates". After being subjected to strengthening, the Examples are referred to as "articles" or "glass-based articles".

Examples are based on a lithium-based glass-based substrate having the following base composition: 63.60 mol % $SiO_2$, 15.67 mol % $Al_2O_3$, 10.81 mol % $Na_2O$, 6.24 mol % $Li_2O$, 1.16 mol % ZnO, 0.04 mol % $SnO_2$, and 2.48 mol % $P_2O_5$ The base composition has an alkali normalized Na content of 0.62 (62 mol %) and an alkali normalized Li content of 0.38 (38 mol %). Thickness of the substrate was 800 micrometers.

In the following examples that reference "diffusion modeling," stress profiles were generated using a two-dimensional (2D) plane strain ion exchange (IOX) model, which is based on finite difference modeling.

Comparative Example A

A glass-based article formed from the above-referenced lithium-based glass-based substrate by a comparative one-step ion exchange treatment was modeled using diffusion modeling. Various IOX baths were modeled, but none were in chemical equilibrium with Li and Na in the base composition. The ion-exchanged metals comprised K, Li, and Na.

Figure 5A:
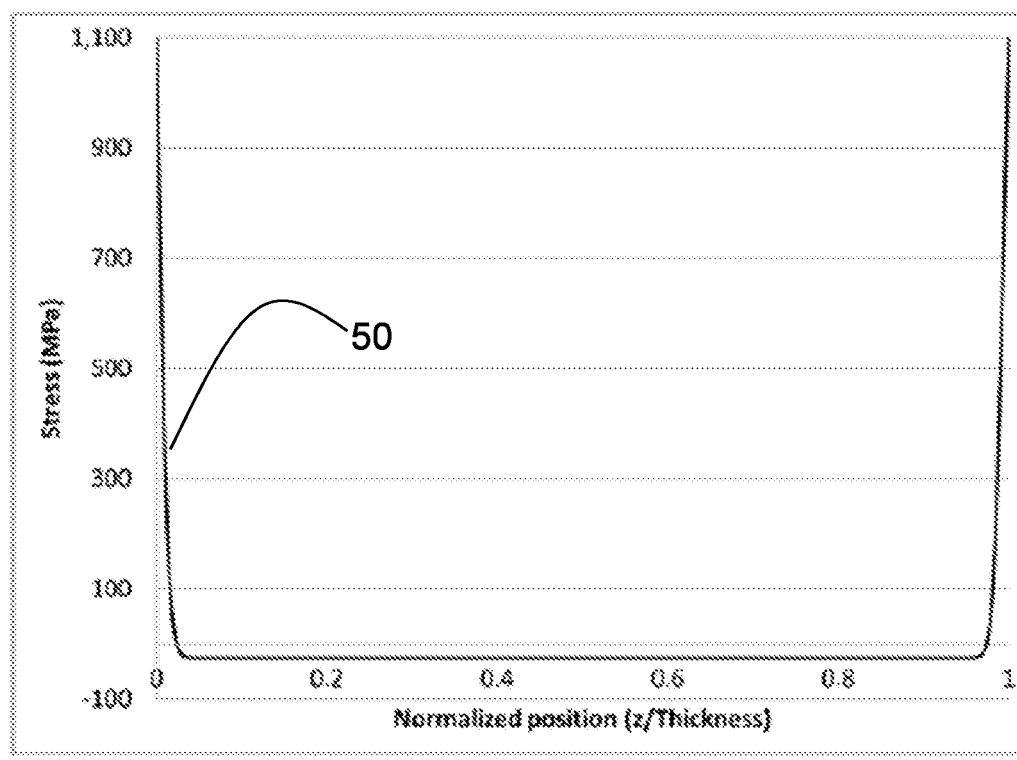
FIGS. 5A and 5B are graphs based on diffusion modeling of a comparative glass-based article that was prepared by a first comparative IOX treatment showing: (a) stress (MPa) versus normalized position (z/thickness) and (b) normalized concentration (a.u.) of ions versus normalized position (z/thickness), respectively.
Figure 5B:
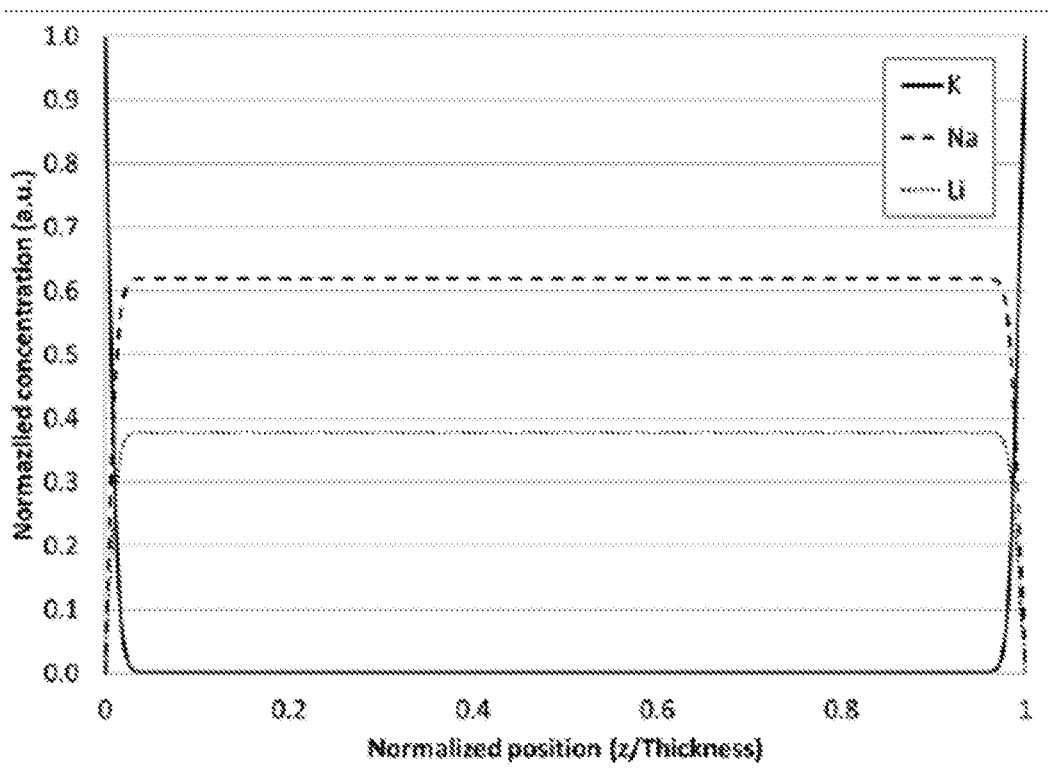

A first comparative IOX bath was 100 mol % K. FIG. 5A shows a stress profile (stress (MPa) versus normalized position (z/thickness)) due to diffusion of a bath that created a 100 mol % K in the surface boundary. There was a large spike 50 due to diffusion of K being exchanged with both Na and Li of the base composition. FIG. 5B shows normalized concentration (a.u.) of ions versus normalized position (z/thickness). Since only potassium that is slow to diffuse was exchanged in, the stress is spiked and ions are exchanged only in the near surface.

Figure 6A:
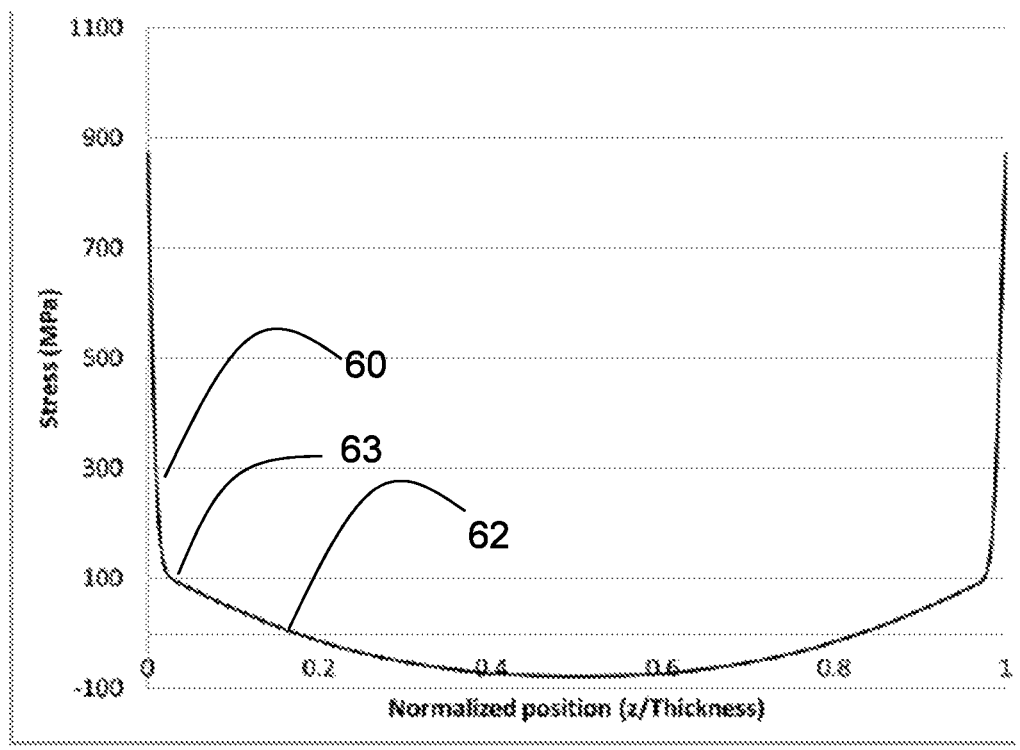
FIGS. 6A and 6B are graphs based on diffusion modeling of a comparative glass-based article that was prepared by a second comparative IOX treatment showing: (a) stress (MPa) versus normalized position (z/thickness) and (b) normalized concentration (a.u.) of ions versus normalized position (z/thickness), respectively.
Figure 6B:
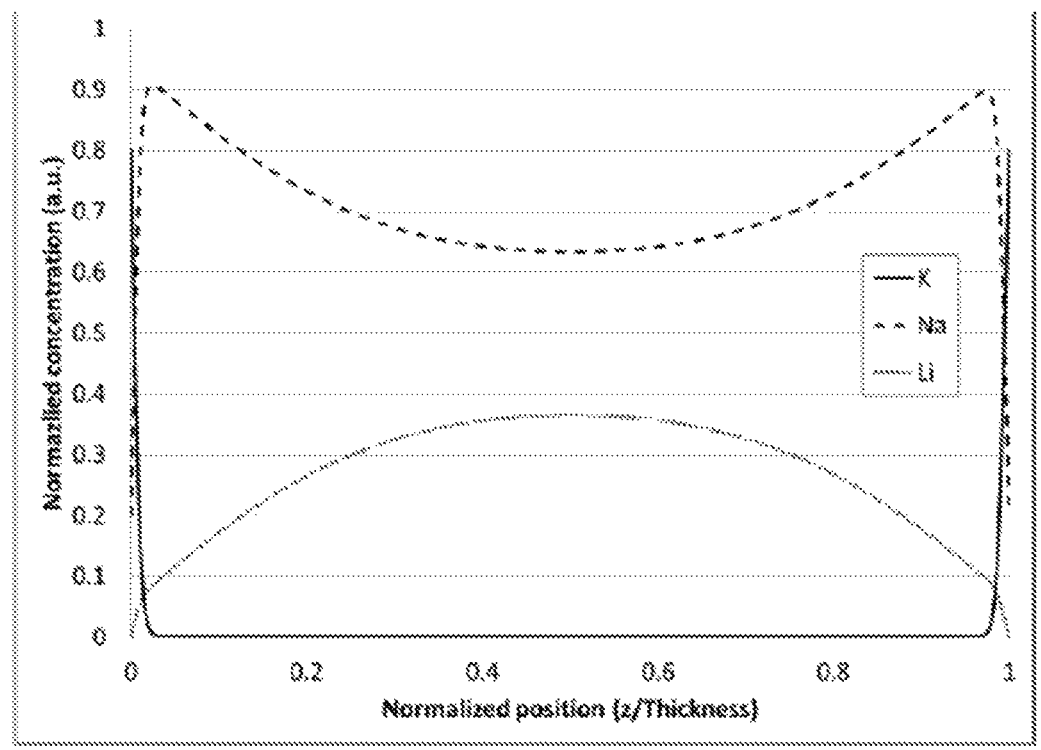

A second comparative IOX bath was a mixture of K and Na. When a mixed bath is present the dynamics get more complex. FIG. 6A shows a stress profile (stress (MPa) versus normalized position (z/thickness)) due to diffusion of the second comparative mixed bath which led to 80 mol % K/20 mol % Na in the surface boundary. There was a spike 60 due to diffusion of the slower K ions exchanging with Li and Na and the presence of a tail 62 due to exchange of Na with Li only. In FIG. 6A, there was a stress of about 100 MPa at the knee 63. Compressive stress (CS) was about 875 MPa. FIG. 6B shows normalized concentration (a.u.) of ions versus normalized position (z/thickness). Enough time was used in the diffusion that the Na ions exchanged with Li ions to the center of the sample.

Figure 7A:
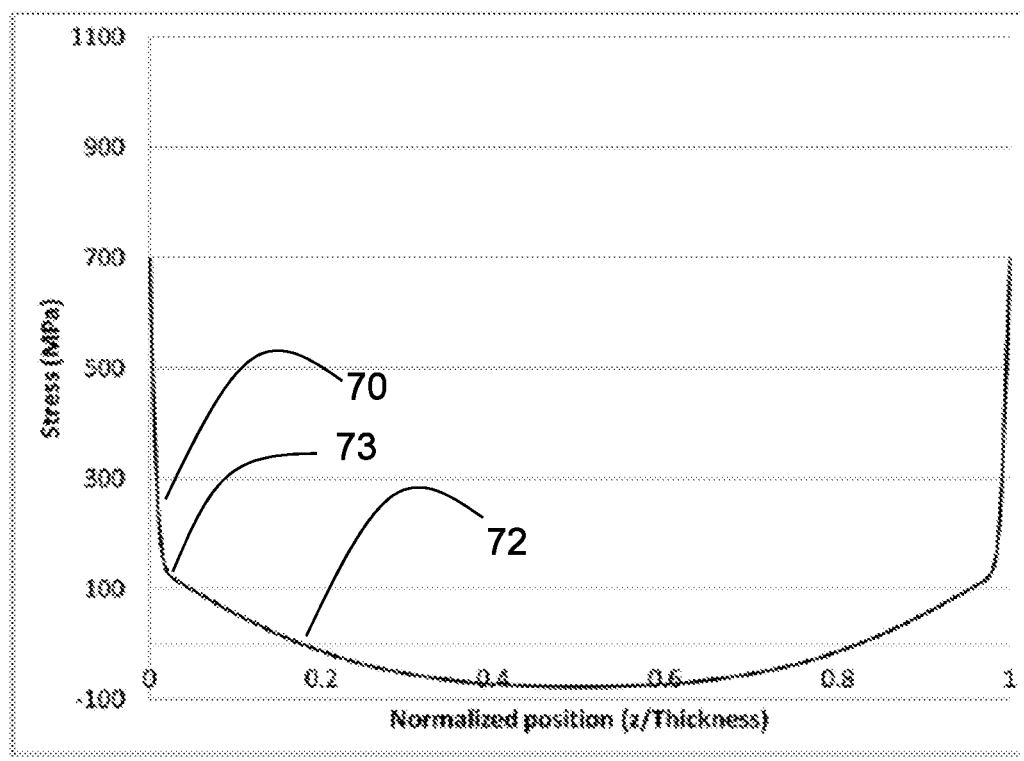
FIGS. 7A and 7B are graphs based on diffusion modeling of a comparative glass-based article that was prepared by a third comparative IOX treatment showing: (a) stress (MPa) versus normalized position (z/thickness) and (b) normalized concentration (a.u.) of ions versus normalized position (z/thickness), respectively.
Figure 7B:
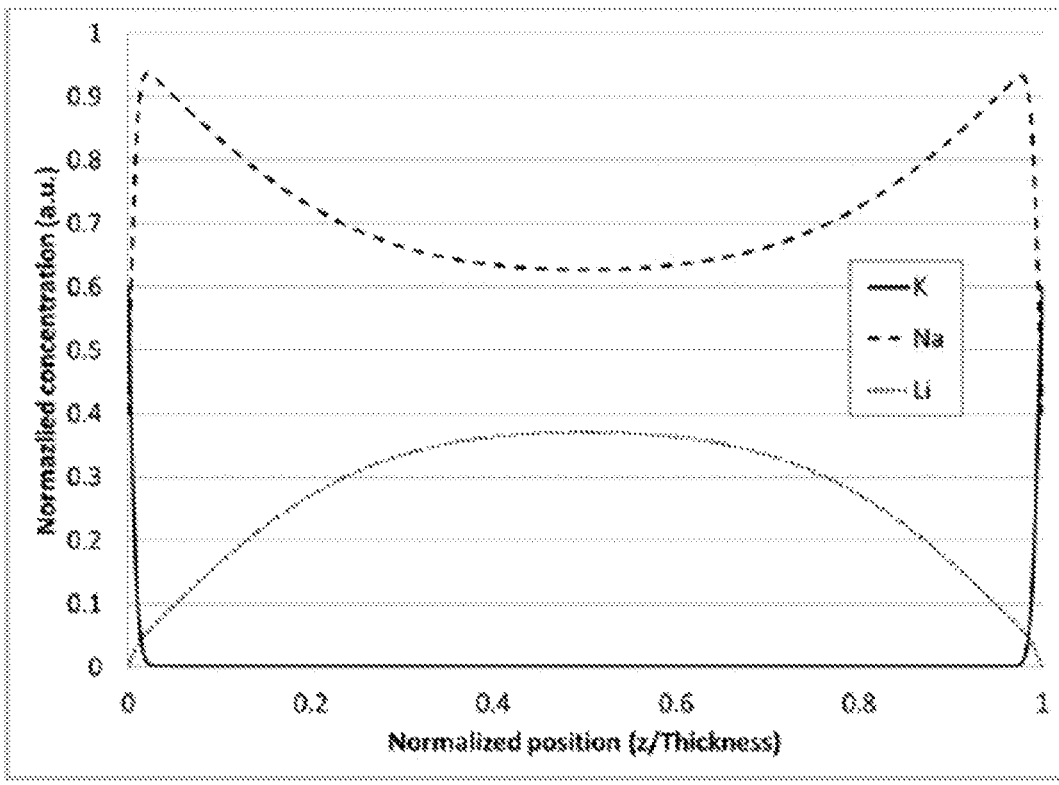

A third comparative IOX bath was a mixture of K and Na different from that of the second comparative bath. Changes to a desired molar content in the boundary of the article results in changes to the stress profile. FIG. 7A shows a stress profile (stress (MPa) versus normalized position (z/thickness)) due to diffusion of the third comparative mixed bath led to 70 mol % K/30 mol % Na in the surface boundary. There was a spike 70 due to diffusion of the slower K ions exchanging with Li and Na and the presence of a tail 72 due to exchange of Na with Li only. In FIG. 7A, there was a stress of about 130 MPa at the knee 73. Compressive stress (CS) was about 700 MPa. FIG. 7B shows normalized concentration (a.u.) of ions versus normalized position (z/thickness). In this case, like with the second comparative IOX bath, the ions of Na diffused to the center of the glass. The ratio of K/Na decreased with the third comparative IOX bath relative to the second IOX bath, and correspondingly, the CS decreased, due to the K being reduced, and CSknee increased, due to the Na being increased.

Figure 8A:
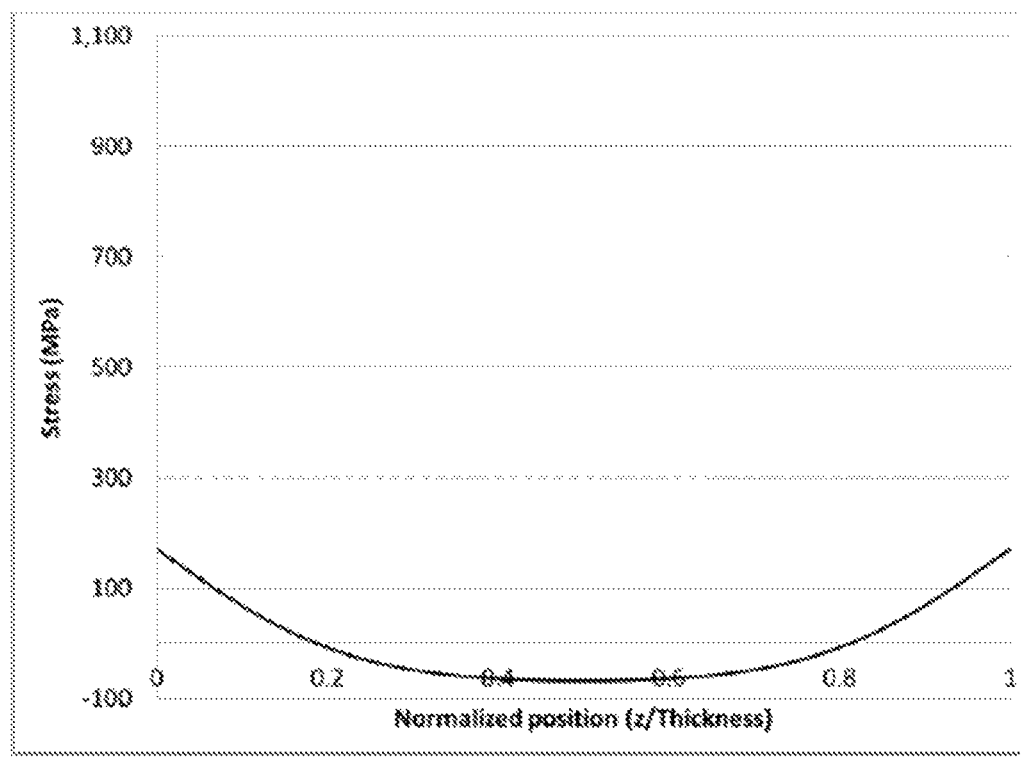
FIGS. 8A and 8B are graphs based on diffusion modeling of a comparative glass-based article that was prepared by a fourth comparative IOX treatment showing: (a) stress (MPa) versus normalized position (z/thickness) and (b) normalized concentration (a.u.) of ions versus normalized position (z/thickness), respectively.
Figure 8B:
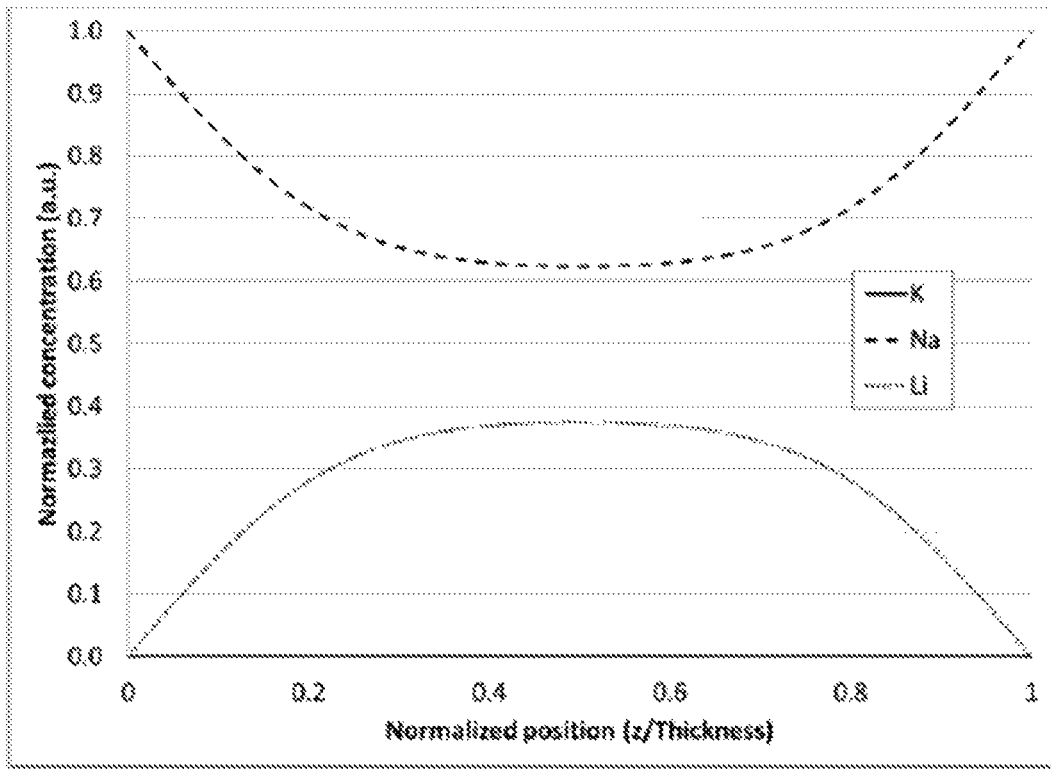

A fourth comparative IOX bath was 100 mol % Na, which is the other limiting case opposite to the case of 100% K of the first comparative IOX bath. FIG. 8A shows a stress profile (stress (MPa) versus normalized position (z/thickness)) due to diffusion of a bath that created 100 mol % Na in the surface boundary. There was not a large spike of induced stress in the profile due to the absence of K. A knee point was not present accordingly. FIG. 8B shows normalized concentration (a.u.) of ions versus normalized position (z/thickness). In this limiting case, only Na was present and exchanged with lithium, which resulted in a quasi-parabolic profile. The stress when the ions diffused to the center led to a DOC of ~21% of the thickness.

Therefore, in the cases of diffusion of glass-based substrates containing lithium and sodium in their base compositions, if a bath containing a binary composition of potassium and sodium is used (not in chemical equilibrium with sodium and lithium ions of substrate), a trade-off usually appears. The largest ratio of K/Na leads to the highest CS and the lowest CSk. Depth of compression will vary slightly due to the force balance where the area under the curve in compression has to be the same as the area under the curve in tension for a flat part. That means also that the largest the spike area the DOC gets slightly reduced. This trade-off is quite important because it is how most of the parts done for manufacturing are built today.

In the second and third comparative IOX baths, which resulted in ratios of 80 K/20 Na, 70 K/30 Na, respectfully in the surface boundaries, the interior of the substrate was diffused with Na due to the fast Na/Li exchange. Without intending to be bound by theory, this happened because there was a lack of equilibrium between the concentration of ions in the bath versus the base composition of the substrate. Since the diffusion of K/Na or K/Li is slow and the diffusion Na/Li is fast the interior of the glass-based substrate moves away from its original stoichiometric composition that in the current example was 62 mol % Na and 38 mol % Li.

Example 1

A glass-based article formed from the above-referenced lithium-based glass-based substrate by a one-step ("quasi-stoichiometric") ion exchange treatment was modeled using diffusion modeling. Two "quasi-stoichiometric" IOX baths, containing three ions, two of which were in chemical equilibrium with ions of the base composition of the underlying glass-based substrate, were modeled. Practical diffusion times were approximately 20 hours at a temperature of 380° C.

Figure 9A:
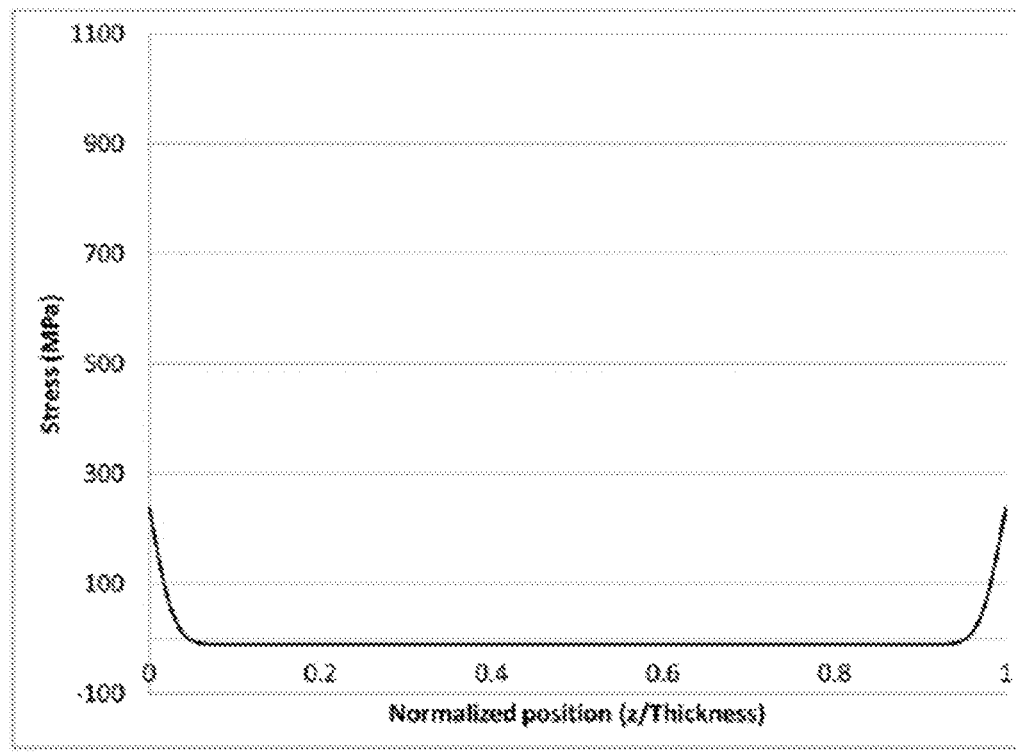
FIGS. 9A and 9B are graphs based on diffusion modeling of a glass-based article that was prepared by a one-step "quasi-stoichiometric" IOX treatment according to an embodiment (Example 1) showing: (a) stress (MPa) versus normalized position (z/thickness) and (b) normalized concentration (a.u.) of ions versus normalized position (z/thickness), respectively.
Figure 9B:
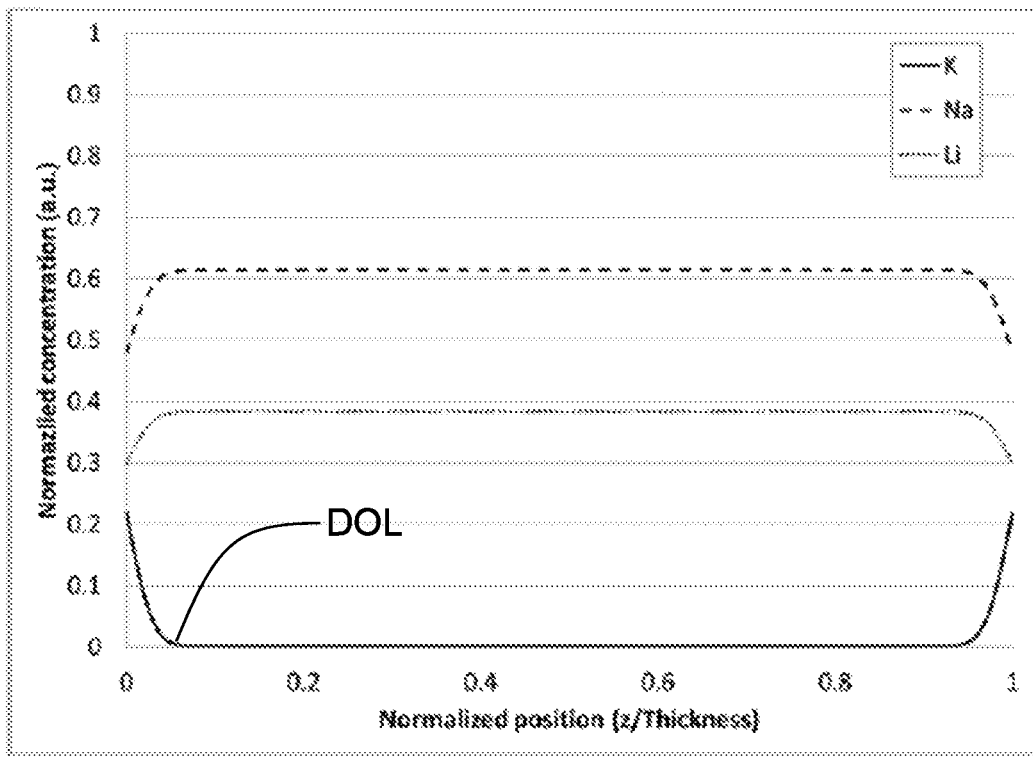

A first three-ion IOX bath led to 22 mol % K/48 mol % Na/30 mol % Li in the surface boundary of a glass-based substrate containing Na and Li. FIG. 9A shows a stress profile (stress (MPa) versus normalized position (z/thickness)) due to diffusion of the bath that created 22 mol % K/48 mol % Na/30 mol % Li in the surface boundary. FIG. 9B shows normalized concentration (a.u.) of ions versus normalized position (z/thickness).

Figure 10A:
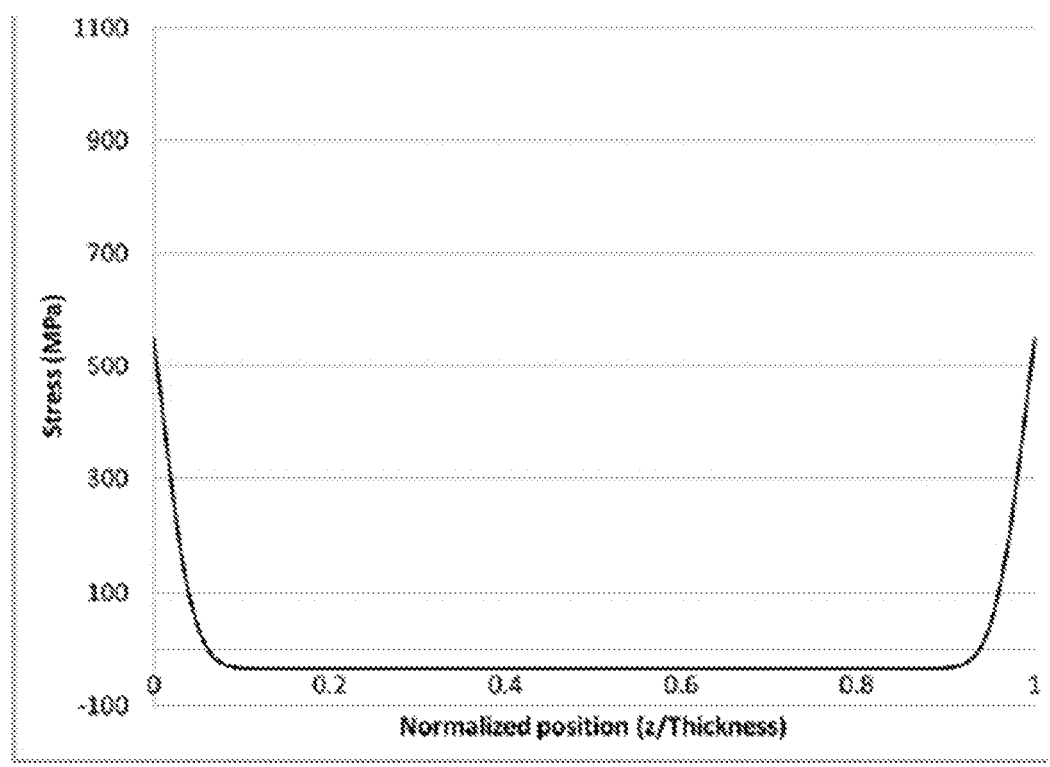
FIGS. 10A and 10B are graphs based on diffusion modeling of a glass-based article that was prepared by a one-step "quasi-stoichiometric" IOX treatment according to an embodiment (Example 1) showing: (a) stress (MPa) versus normalized position (z/thickness) and (b) normalized concentration (a.u.) of ions versus normalized position (z/thickness), respectively.
Figure 10B:
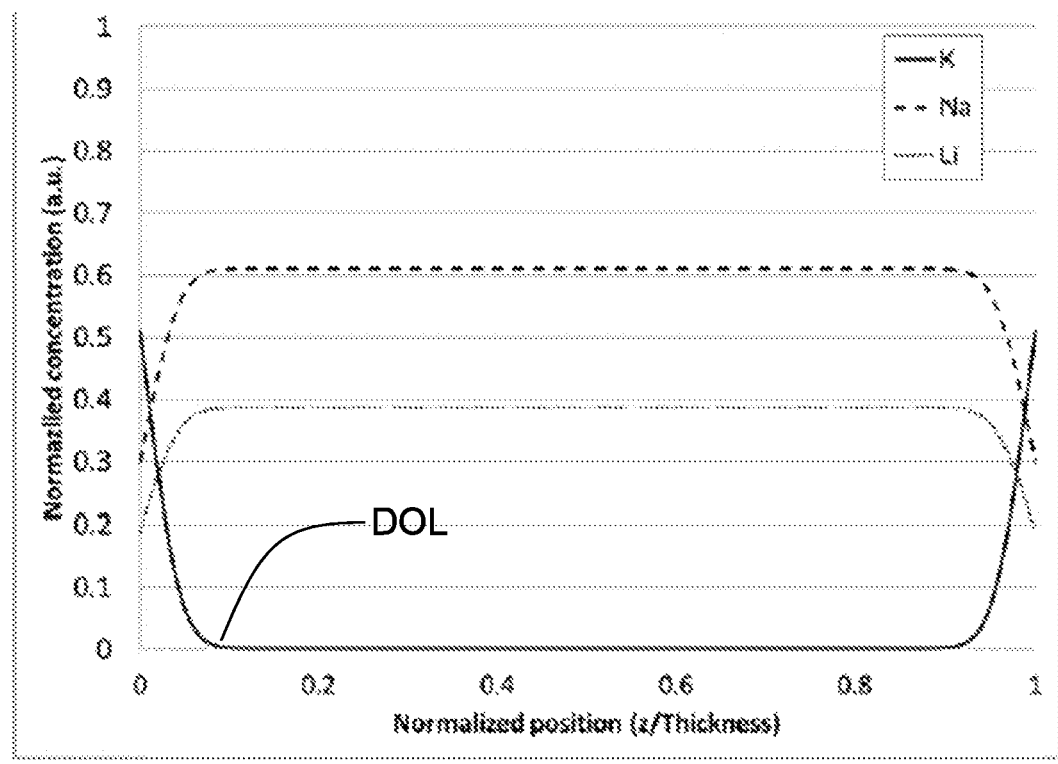

A second three-ion IOX bath led to 51 mol % K/30 mol % Na/19 mol % Li in the surface boundary of a glass-based substrate containing Na and Li. FIG. 10A shows a stress profile (stress (MPa) versus normalized position (z/thickness)) due to diffusion of the bath that created 51 mol % K/20 mol % Na/19 mol % Li in the surface boundary. FIG. 10B shows normalized concentration (a.u.) of ions versus normalized position (z/thickness).

Referring to FIGS. 9A and 9B, the glass-based articles modeled in Example 1 show that surface concentration of the two alkali metal oxides of the base composition (Li and Na) were non-zero at one or both of the first and second surfaces of the substrate. Also, the metal oxide (K) diffused-in had a non-zero concentration that varied from the first surface to a depth of layer (DOL) with respect to the metal oxide.

It was surprising and unexpected that the complex three-ion mixed salt baths led to a diffusion of potassium at the surface without a significant change in the ionic base composition inside the glass-based substrates as shown in FIGS. 9B and 10B. In accordance with Example 1, an ion such as potassium, which is not present in the base composition, can be diffused into a substrate while keeping the composition in the interior of the substrate at its original base composition, or in practice within 10% or less of the individual concentrations of metals.

Example 2

A glass-based article formed from the above-referenced lithium-based glass-based substrate by a two-step ion exchange treatment including a "quasi-stoichiometric" bath and a traditional diffusion bath was modeled using diffusion modeling.

Figure 11A:
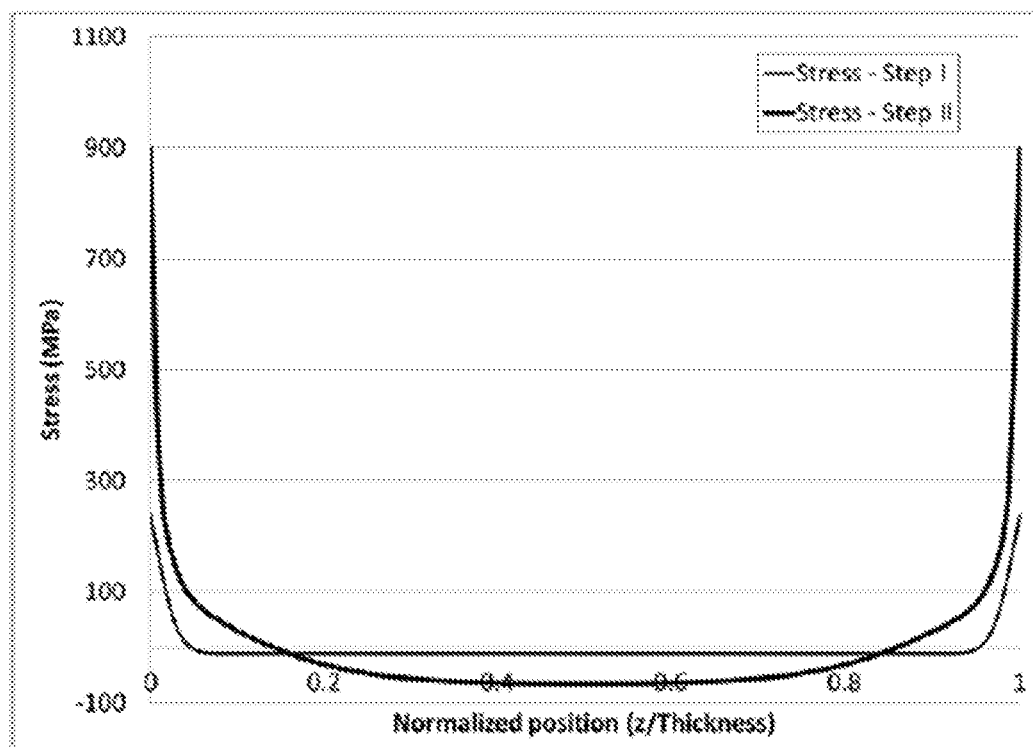
FIGS. 11A and 11B are graphs based on diffusion modeling of a glass-based article that was prepared by a two-step IOX treatment including a "quasi-stoichiometric" bath and a traditional diffusion bath according to an embodiment (Example 2) showing: (a) stress (MPa) versus normalized position (z/thickness) and (b) normalized concentration (a.u.) of ions versus normalized position (z/thickness), respectively.

Step I of the treatment, in accordance with the first three-ion IOX bath of Example 1, included a first "quasi-stoichiometric" bath that led to 22 mol % K/48 mol % Na/30 mol % Li in the surface boundary of a glass-based substrate containing Na and Li (Step I). This was followed by Step II, which included a bath that led to diffusion of 90 mol % K/10 mol % Na in the surface boundary. In FIG. 11A, which is the stress profile (stress (MPa) versus normalized position (z/thickness)) after each of Step I and Step II, it is shown that initial stress due to the 22 mol % K in Step I, ~250 MPa was formed independently of the Li and Na content under the quasi-stoichiometric condition. Step II had an additive effect to the initial potassium diffused to increase the compressive stress at the surface to about 900 MPa.

Figure 11B:
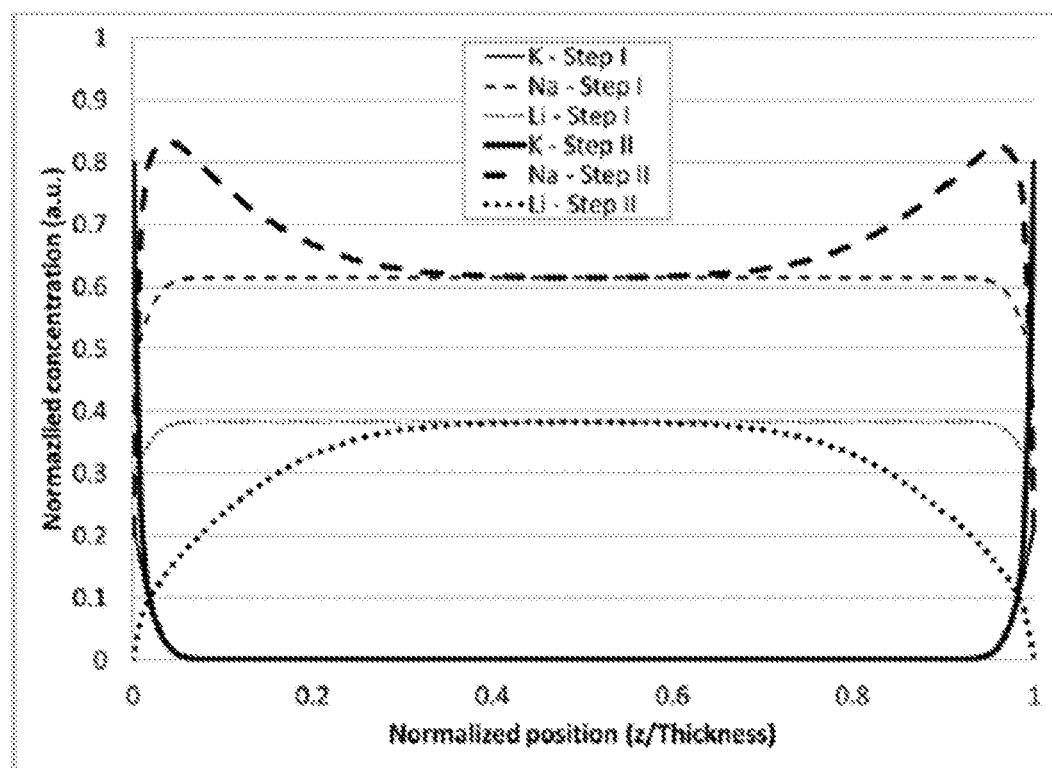

FIG. 11B is normalized concentration (a.u.) of ions versus normalized position (z/thickness) after each of Step I and Step II. After Step I, the base composition beyond the K DOL was basically not modified, which is a characteristic of the first quasi-stoichiometric diffusion. After the subsequent ion-exchange, Step II, ion concentrations in the center were modified as usual. However, potassium present from Step I helped to create additional stresses near the surface.

Figure 12A:
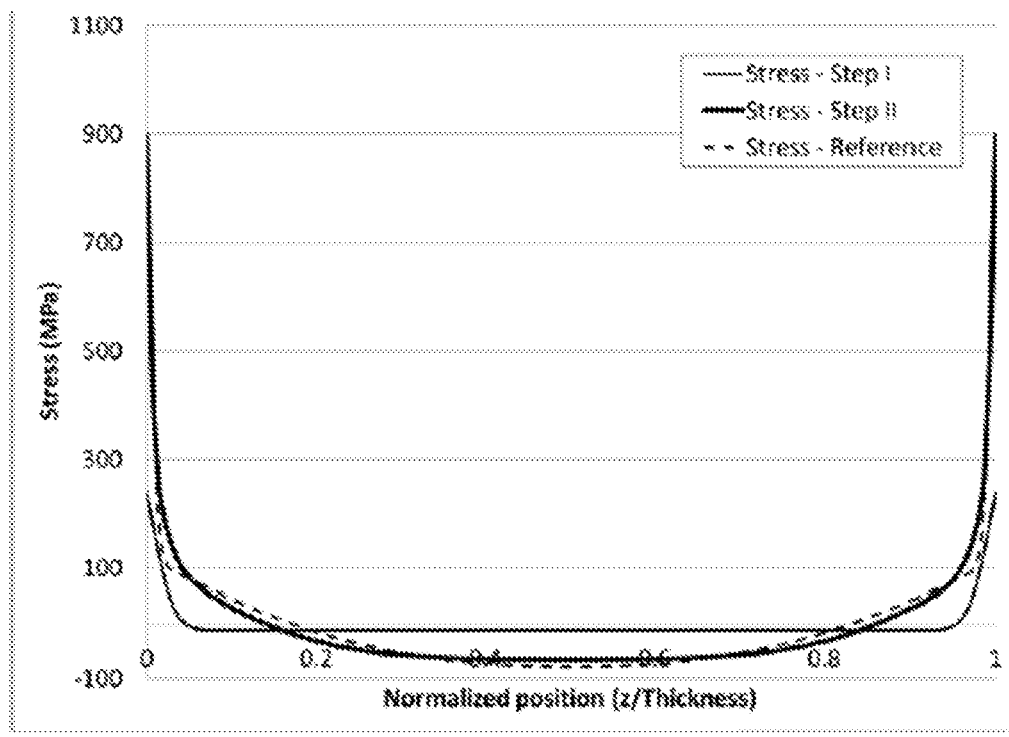
FIGS. 12A and 12B are graphs based on diffusion modeling of a glass-based article that was prepared by a two-step IOX treatment including a "quasi-stoichiometric" bath and a traditional diffusion bath according to Example 2 showing: (a) stress (MPa) versus normalized position (z/thickness) for both FIG. 11A and a reference, and (b) is a magnified view of (a), respectively.
Figure 12B:
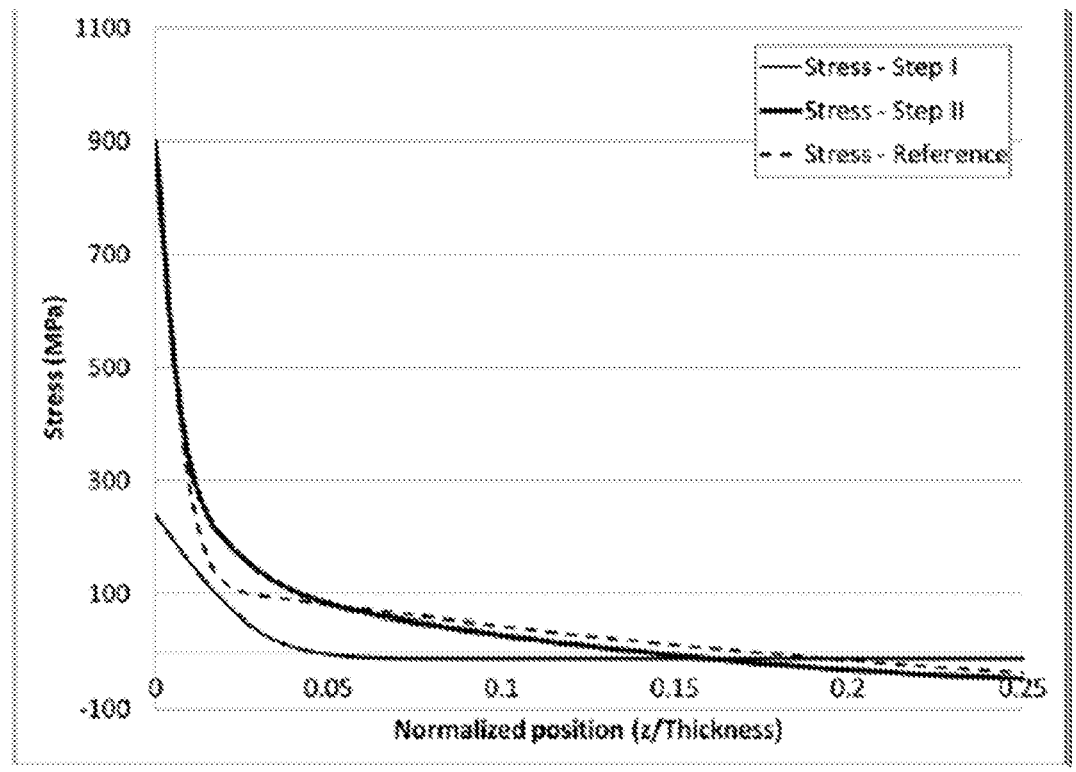

For reference, a binary IOX bath that led to diffusion of 90 mol % K/10 mol % Na in the surface boundary was modeled using diffusion modeling. In FIG. 12A, the combined stress profile of FIG. 11A was compared against the single diffusion reference of 90 mol % K/10 mol % Na in the surface boundary. The comparison shows the net effect of the initial quasi-stoichiometric step. The presence of the quasi-stoichiometric step increases the area of the spike region but due to force balance reduces DOC a little as result. In FIG. 12B, a magnified view of the stress profile of FIG. 12A shows that due to the use of a quasi-stoichiometric first step, there is not a well-defined knee, rather there is a gradual transition region. CSknee at what was the knee region was higher. This is due to the presence of the potassium diffused in the quasi-stoichiometric first step, which decouples the CSknee from potassium spike. Stress profiles may be tuned without the original trade-offs highlighted with respect to FIGS. 5A-5B, 6A-6B, 7A-7B, and 8A-8B. The ability to tune profiles can lead to unique stress profiles that could not be achieved before.

Example 3

A glass-based article formed from the above-referenced lithium-based glass-based substrate by a three-step ion exchange treatment including a "quasi-stoichiometric" bath and two traditional diffusion baths was modeled using diffusion modeling.

Figure 13A:
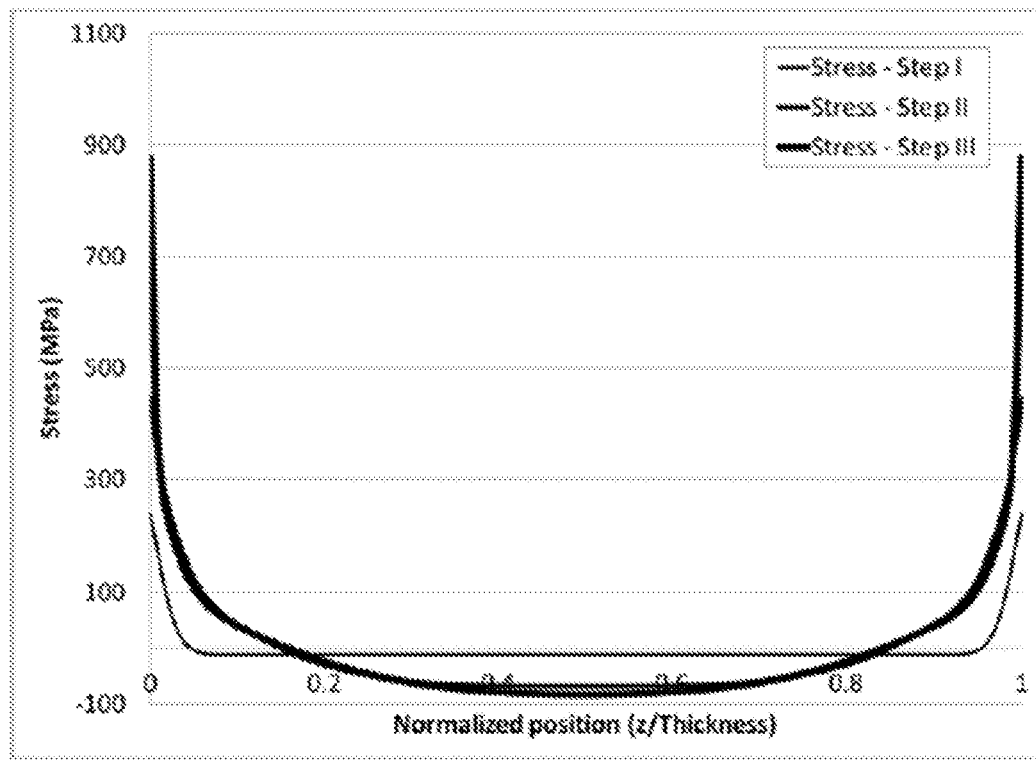
FIGS. 13A and 13B are graphs based on diffusion modeling of a glass-based article that was prepared by a three-step IOX treatment including a "quasi-stoichiometric" bath and a dual diffusion baths according to an embodiment (Example 3) showing: (a) stress (MPa) versus normalized position (z/thickness) and (b) normalized concentration (a.u.) of ions versus normalized position (z/thickness), respectively.

Step I of the treatment, in accordance with the first three-ion IOX bath of Example 1, included a first "quasi-stoichiometric" bath that led to 22 mol % K/48 mol % Na/30 mol % Li in the surface boundary of a glass-based substrate containing Na and Li (Step I). This was followed by Step II, which included a bath that led to diffusion of 30 mol % K/70 mol % Na in the surface boundary. This was followed by Step III, in accordance with Step II of Example 2, which included a bath that led to diffusion of 90 mol % K/10 mol % Na in the surface boundary. In FIG. 13A, which is the stress profile (stress (MPa) versus normalized position (z/thickness)) after each of Step I, Step II, and Step III, it is again shown that initial stress due to the 22 mol % K in Step I, ~250 MPa was formed independently of the Li and Na content under the quasi-stoichiometric condition. Step II had the effect of creating a tail of the stress profile. Step III had an additive effect to the initial potassium diffused to increase the compressive stress at the surface to about 875 MPa.

Figure 13B:
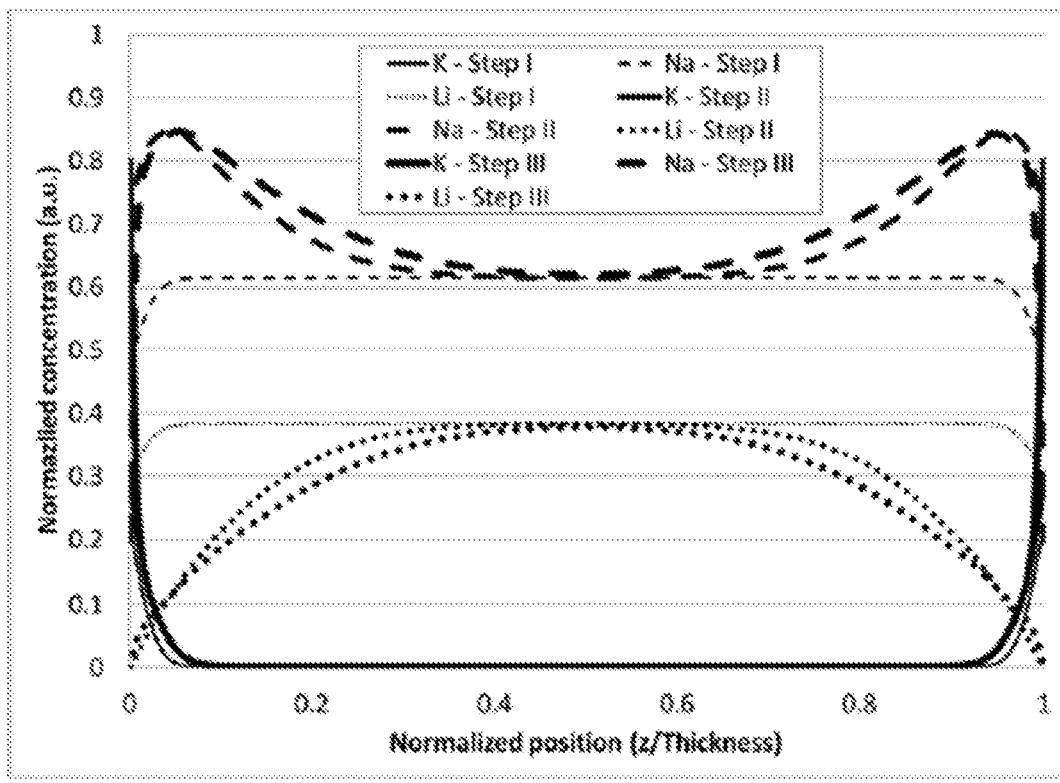

FIG. 13B is normalized concentration (a.u.) of ions versus normalized position (z/thickness) after each of Step I, Step II, and Step III. After Step I, the base composition beyond the K DOL was basically not modified, which is a characteristic of the first quasi-stoichiometric diffusion. After the subsequent ion-exchanges, Steps II-III, ion concentrations in the center were modified as usual. However, potassium present from Step I helped to create additional stresses near the surface.

Figure 14A:
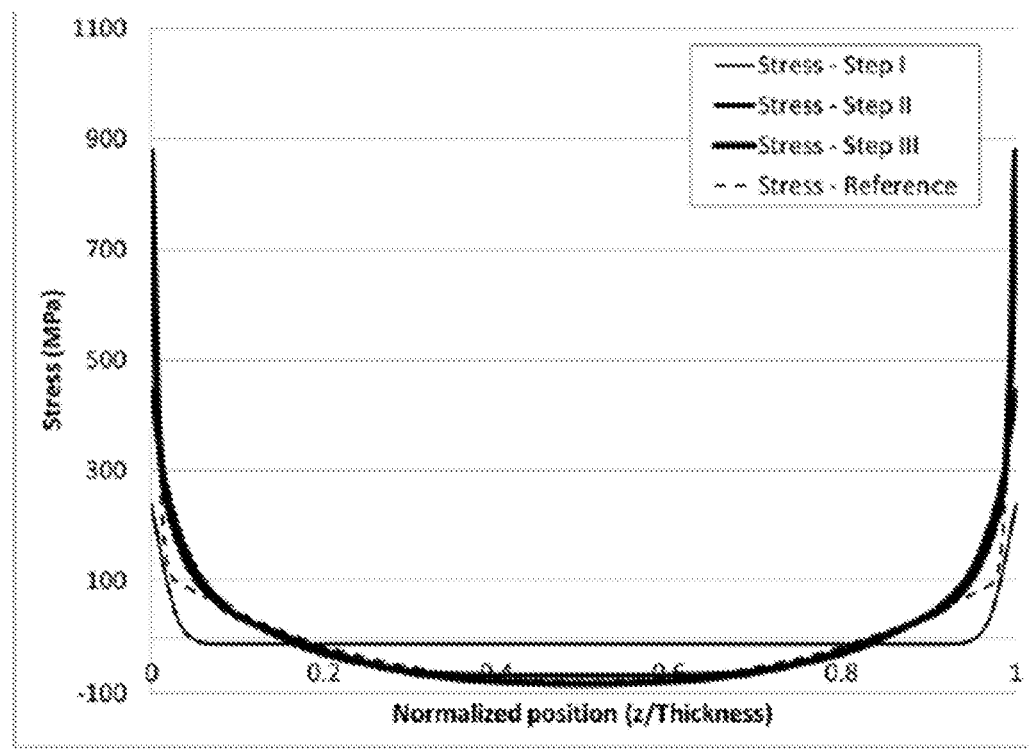
FIGS. 14A and 14B are graphs based on diffusion modeling of a glass-based article that was prepared by a three-step IOX treatment including a "quasi-stoichiometric" bath and a dual diffusion baths according to Example 3: (a) stress (MPa) versus normalized position (z/thickness) for both FIG. 13A and a reference, and (b) is a magnified view of (a), respectively.
Figure 14B:
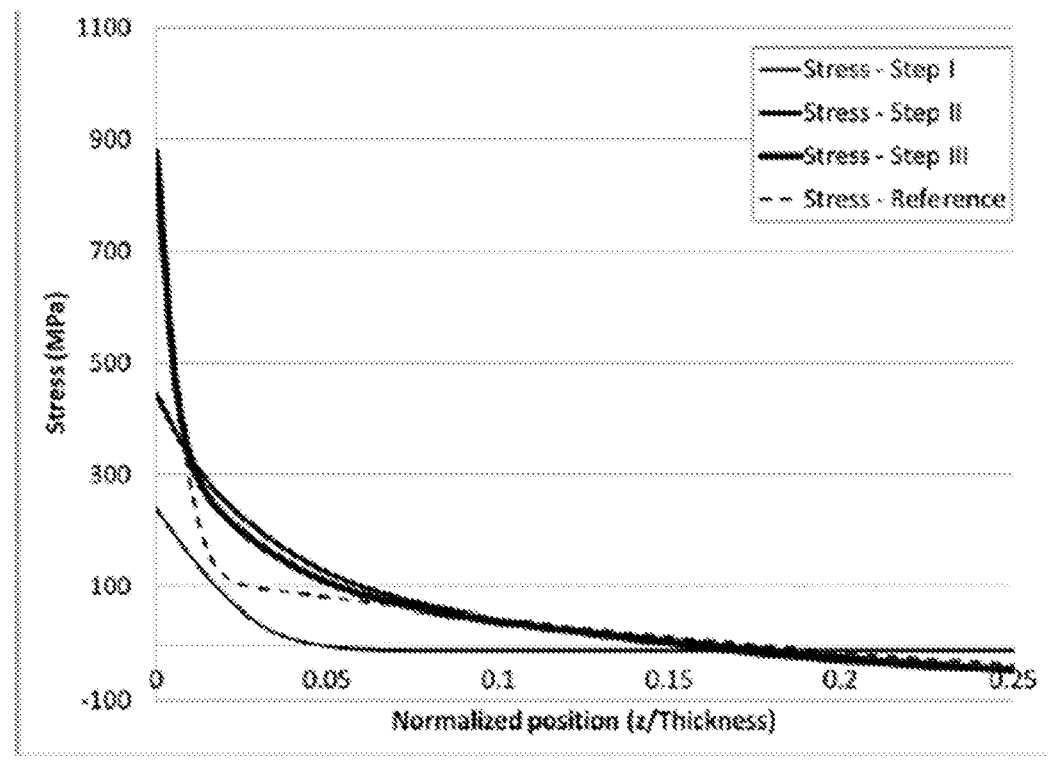

For reference, a binary IOX bath that led to diffusion of 90 mol % K/10 mol % Na in the surface boundary was modeled using diffusion modeling. In FIG. 14A, the combined stress profile of FIG. 13A was compared against the single diffusion reference of 90 mol % K/10 mol % Na in the surface boundary. The comparison shows the net effect of the initial quasi-stoichiometric step. The presence of the quasi-stoichiometric step increases the area of the spike region but due to force balance reduces DOC a little as result. In FIG. 14B, a magnified view of the stress profile of FIG. 14A shows that due to the use of a quasi-stoichiometric first step, there is not a well-defined knee, rather there is a gradual transition region. CSknee at what was the knee region was higher. This is due to the presence of the potassium diffused in the quasi-stoichiometric first step, which decouples the CSknee from potassium spike. Stress profiles may be tuned without the original trade-offs highlighted with respect to FIGS. 5A-5B, 6A-6B, 7A-7B, and 8A-8B. The ability to tune profiles can lead to unique stress profiles that could not be achieved before.

Example 4

A glass-based article formed from the above-referenced lithium-based glass-based substrate by a two-step ion exchange treatment including a "quasi-stoichiometric" bath and a traditional diffusion bath was modeled using diffusion modeling.

Figure 15A:
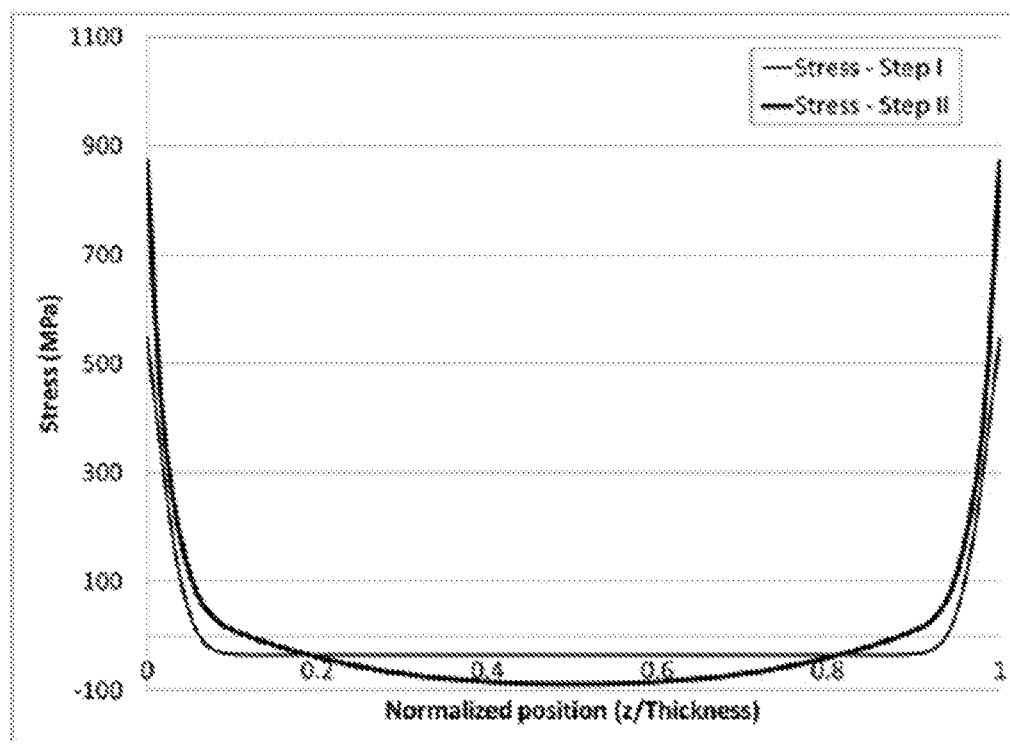
FIGS. 15A and 15B are graphs based on diffusion modeling of a glass-based article that was prepared by a two-step IOX treatment including a "quasi-stoichiometric" bath and a traditional diffusion bath according to an embodiment (Example 4) showing: (a) stress (MPa) versus normalized position (z/thickness) and (b) normalized concentration (a.u.) of ions versus normalized position (z/thickness), respectively.

Step I of the treatment, in accordance with the second three-ion IOX bath of Example 1, included a first "quasi-stoichiometric" bath that led to 51 mol % K/20 mol % Na/19 mol % Li in the surface boundary of a glass-based substrate containing Na and Li (Step I). This was followed by Step II, which included a bath that led to diffusion of 90 mol % K/10 mol % Na in the surface boundary. In FIG. 15A, which is the stress profile (stress (MPa) versus normalized position (z/thickness)) after each of Step I and Step II, it is shown that initial stress due to the 51 mol % K in Step I, ~575 MPa was formed independently of the Li and Na content under the quasi-stoichiometric condition. Step II had an additive effect to the initial potassium diffused to increase the compressive stress at the surface to about 850 MPa.

Figure 15B:
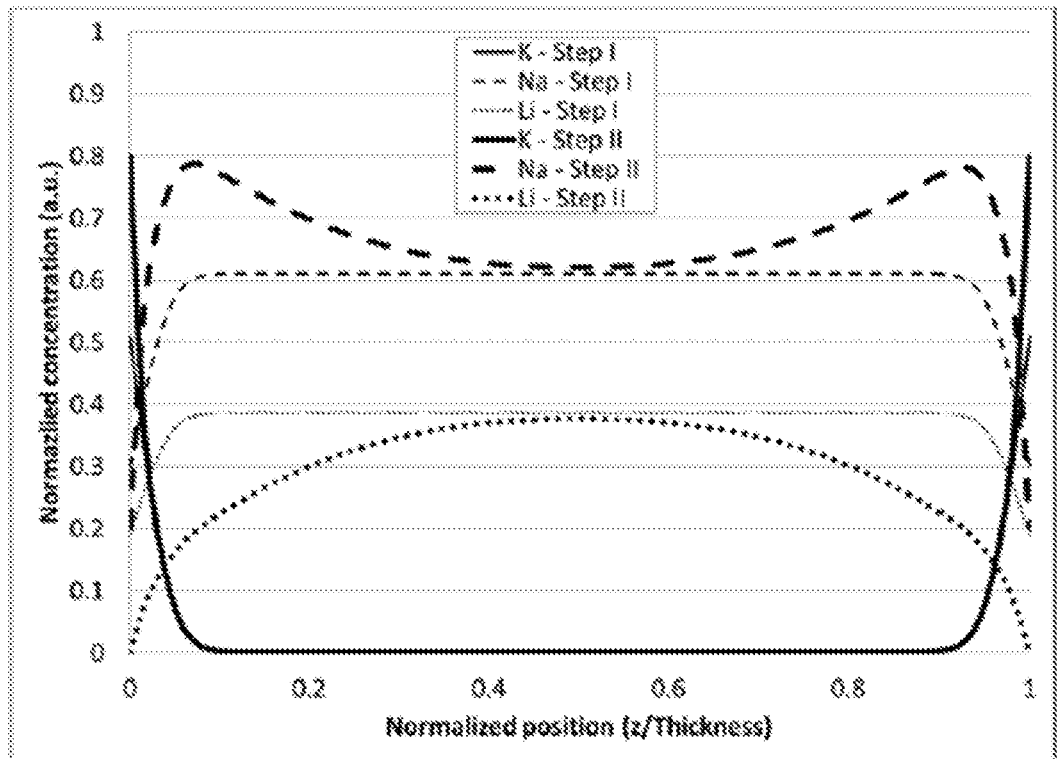

FIG. 15B is normalized concentration (a.u.) of ions versus normalized position (z/thickness) after each of Step I and Step II. After Step I, the base composition beyond the K DOL was basically not modified, which is a characteristic of the first quasi-stoichiometric diffusion. After the subsequent ion-exchange, Step II, ion concentrations in the center were modified as usual. However, potassium present from Step I helped to create additional stresses near the surface.

Figure 16A:
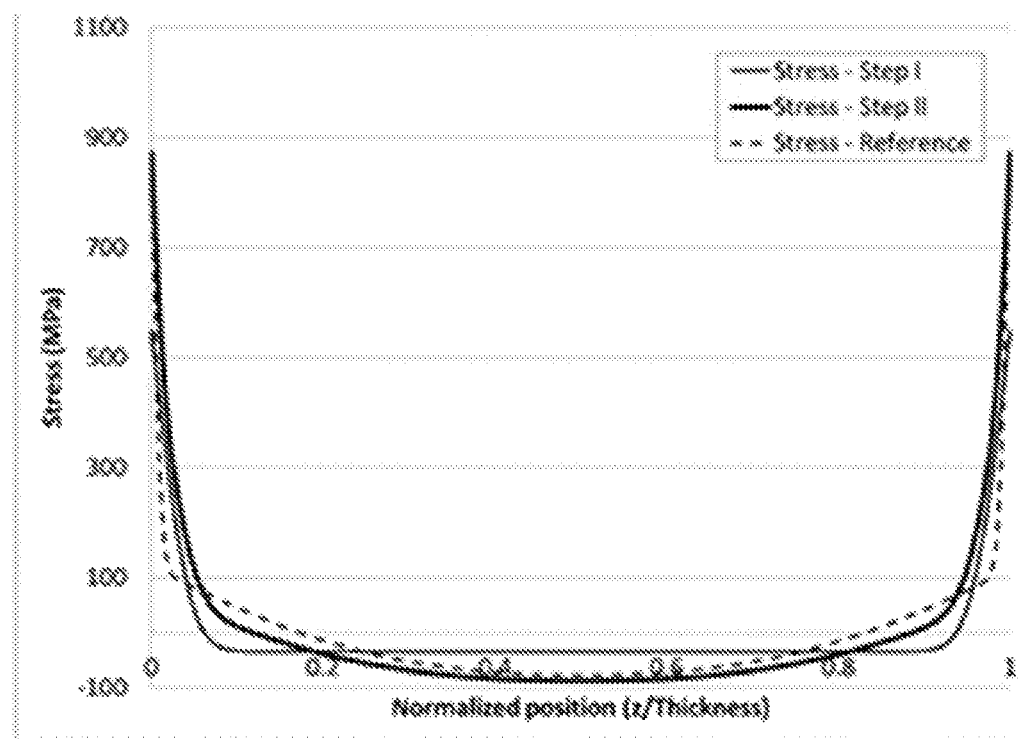
FIGS. 16A and 16B are graphs based on diffusion modeling of a glass-based article that was prepared by a two-step IOX treatment including a "quasi-stoichiometric" bath and a traditional diffusion bath according to Example 4 showing: (a) stress (MPa) versus normalized position (z/thickness) for both FIG. 15A and a reference, and (b) normalized concentration (a.u.) of ions versus normalized position (z/thickness), respectively.
Figure 16B:
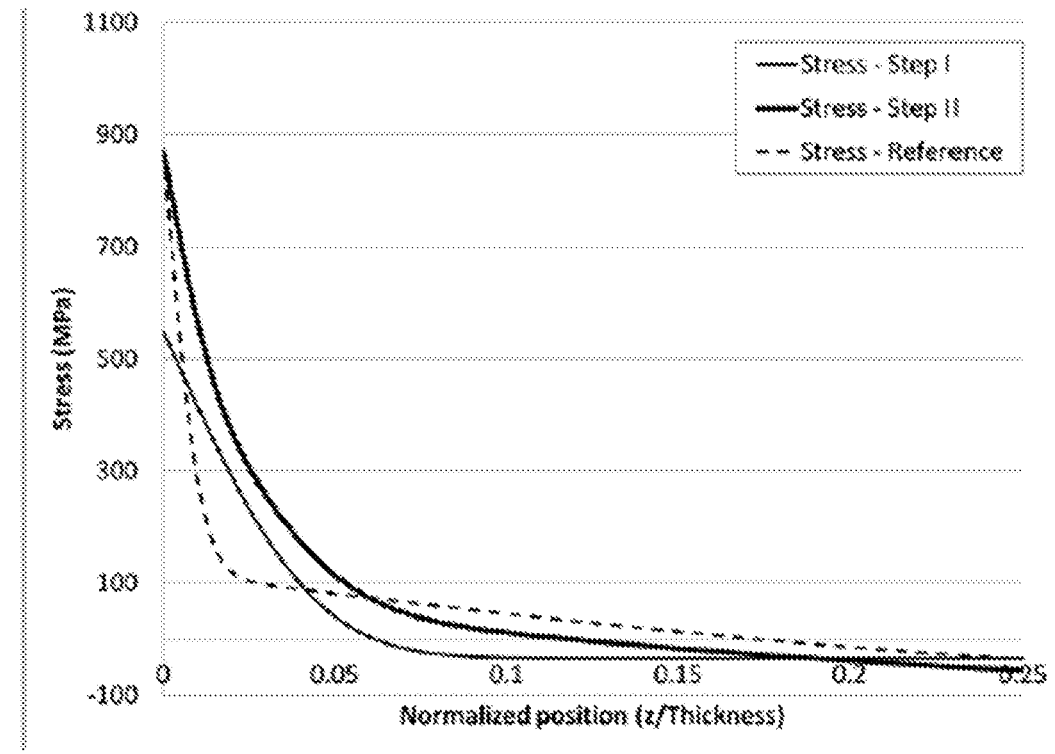

For reference, a binary IOX bath that led to diffusion of 90 mol % K/10 mol % Na in the surface boundary was modeled using diffusion modeling. In FIG. 16A, the combined stress profile of FIG. 15A was compared against the single diffusion reference of 90 mol % K/10 mol % Na in the surface boundary. The comparison shows the net effect of the initial quasi-stoichiometric step. The presence of the quasi-stoichiometric step increases the area of the spike region but due to force balance reduces DOC a little as result. In FIG. 16B, a magnified view of the stress profile of FIG. 16A shows that due to the use of a quasi-stoichiometric first step, there is not a well-defined knee, rather there is a gradual transition region. CSknee at what was the knee region was higher. This is due to the presence of the potassium diffused in the quasi-stoichiometric first step, which decouples the CSknee from potassium spike. Stress profiles may be tuned without the original trade-offs highlighted with respect to FIGS. 5A-5B, 6A-6B, 7A-7B, and 8A-8B. The ability to tune profiles can lead to unique stress profiles that could not be achieved before.

The higher K in the quasi-stoichiometric bath used in Example 4 (FIGS. 15A-15B) enhances the spike region as compared to Example 2 (FIGS. 11A-11B) and creates stress at depth in a gradual way. The same larger K content will also generate more stress at depth that will via force balance reduce the DOC of the total profile.

Example 5

A glass-based article formed from the above-referenced lithium-based glass-based substrate by a three-step ion exchange treatment including two "quasi-stoichiometric" baths and one traditional diffusion bath was modeled using diffusion modeling.

Figure 17A:
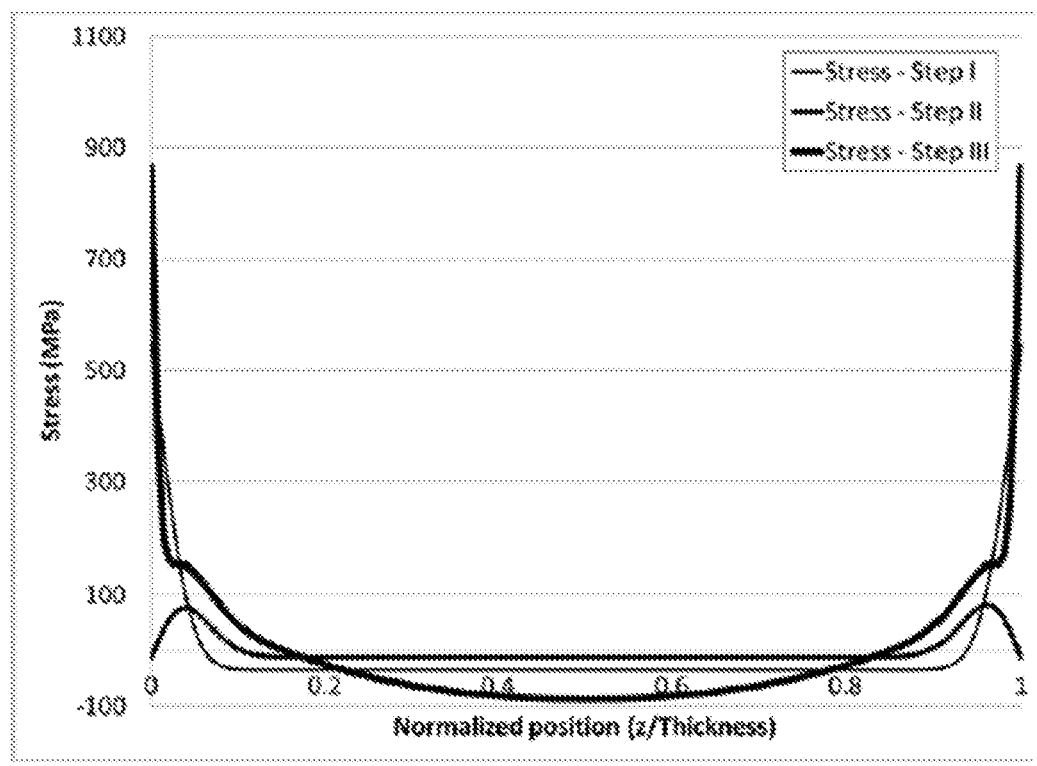
FIGS. 17A and 17B are graphs based on diffusion modeling of a glass-based article that was prepared by a two-step IOX treatment including a "quasi-stoichiometric" bath and a dual diffusion bath according to an embodiment (Example 5) showing: (a) stress (MPa) versus normalized position (z/thickness) and (b) normalized concentration (a.u.) of ions versus normalized position (z/thickness), respectively.

Step I of the treatment, in accordance with the second three-ion IOX bath of Example 1 (practical diffusion time was ~20 hours at a temperature of 380° C.), included a first "quasi-stoichiometric" bath that led to 51 mol % K/20 mol % Na/19 mol % Li in the surface boundary of a glass-based substrate containing Na and Li (Step I). This was followed by Step II, another "quasi-stoichiometric" bath (no K, shorter time than Step I) that led to diffusion of 0 mol % K/62 mol % Na/38 mol % Li in the surface boundary (practical diffusion time was ~5 hours at a temperature of 380° C.). This was followed by Step III, in accordance with Step II of Example 2, which included a bath that led to diffusion of 90 mol % K/10 mol % Na in the surface boundary. FIG. 17A is the stress profile (stress (MPa) versus normalized position (z/thickness)) after each of Step I, Step II, and Step III. Initial stress due to the 51 mol % K in Step I created stress at the surface and at depth. Step II had the effect of removing stress at the surface. Step III restored compressive stress at the surface and created the final tail of the profile. The overall effect was to create a hump at moderate depths.

Figure 17B:
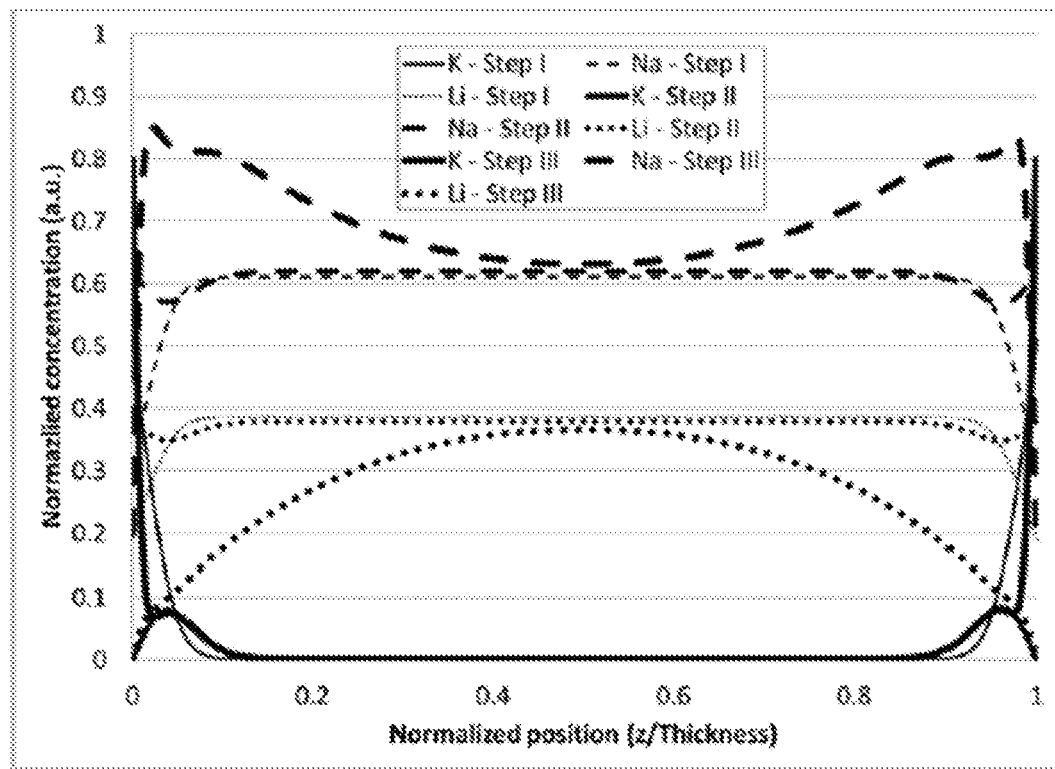

FIG. 17B is normalized concentration (a.u.) of ions versus normalized position (z/thickness) after each of Step I, Step II, and Step III. After Steps I and II, the base composition beyond the K DOL was basically not modified, which is a characteristic of quasi-stoichiometric diffusion. After the subsequent ion-exchange, Step III, ion concentrations in the center were modified as usual.

Figure 18A:
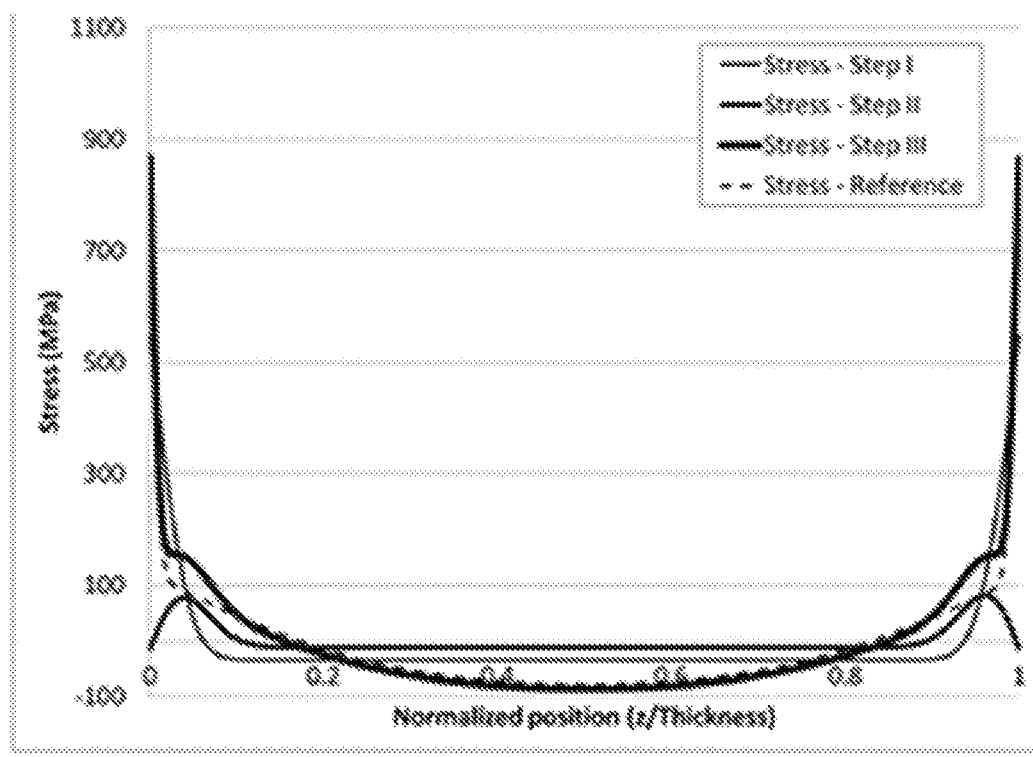
FIGS. 18A and 18B are graphs based on diffusion modeling of a glass-based article that was prepared by a two-step IOX treatment including a "quasi-stoichiometric" bath and a dual diffusion bath according to Example 5 showing: (a) stress (MPa) versus normalized position (z/thickness) for both FIG. 17A and a reference, and (b) normalized concentration (a.u.) of ions versus normalized position (z/thickness), respectively.
Figure 18B:
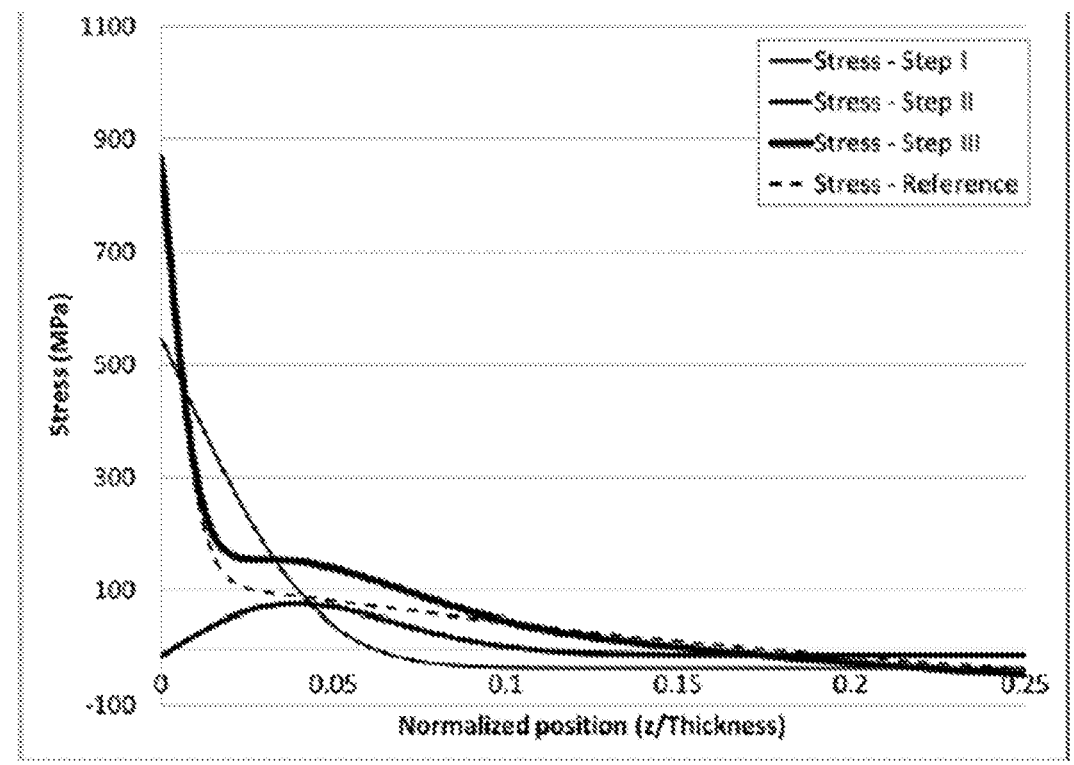

For reference, a binary IOX bath that led to diffusion of 90 mol % K/10 mol % Na in the surface boundary was modeled using diffusion modeling. In FIG. 18A, the combined stress profile of FIG. 17A was compared against the single diffusion reference of 90 mol % K/10 mol % Na in the surface boundary. The comparison shows the net effect of the two quasi-stoichiometric steps. The presence of the second shorter and no K quasi-stoichiometric step modified the knee and spike region. In FIG. 18B, a magnified view of the stress profile of FIG. 18A shows a hump in the transition region.

Example 6

Experiments were conducted to experimentally find mixed bath conditions that would lead to the appearance of an approximate condition of quasi-stoichiometry where the potassium (or other ion not present in the glass) could diffuse without affecting the original concentration of ions inside the glass. As explained previously, this means the ratio of ions inside the glass is maintained at the ratio of Na mol %/Li mol %=0.62/0.38=~1.63 at the surface boundary for the above-referenced lithium-based glass-based substrate. It is noted that for substrates of other base compositions, the targeted ratio at the surface boundary would be different. Multiple experiments were conducted using varying bath compositions, and compositions that led to the desired ratio were identified experimentally, the first and second IOX baths of this example. The ratio at the surface boundary as previously mentioned is not the same ratio in the bath, therefore, there can be multiple iterations to identify the appropriate bath composition. Ionic distribution inside the article was measured via GDOES (Glow discharge optical emission spectroscopy). Here the potassium (ion not present in the substrate) from the mixed bath diffused near the surface while the ions at the center of the substrate remain approximately not changed. Outside the region where the potassium is diffused the article keeps the original base composition while only the slow potassium ions are diffused in the immediate outside surface.

A glass-based article was formed from the above-referenced lithium-based glass-based substrate by a one-step ion exchange treatment including a "quasi-stoichiometric" bath.

Figure 19:
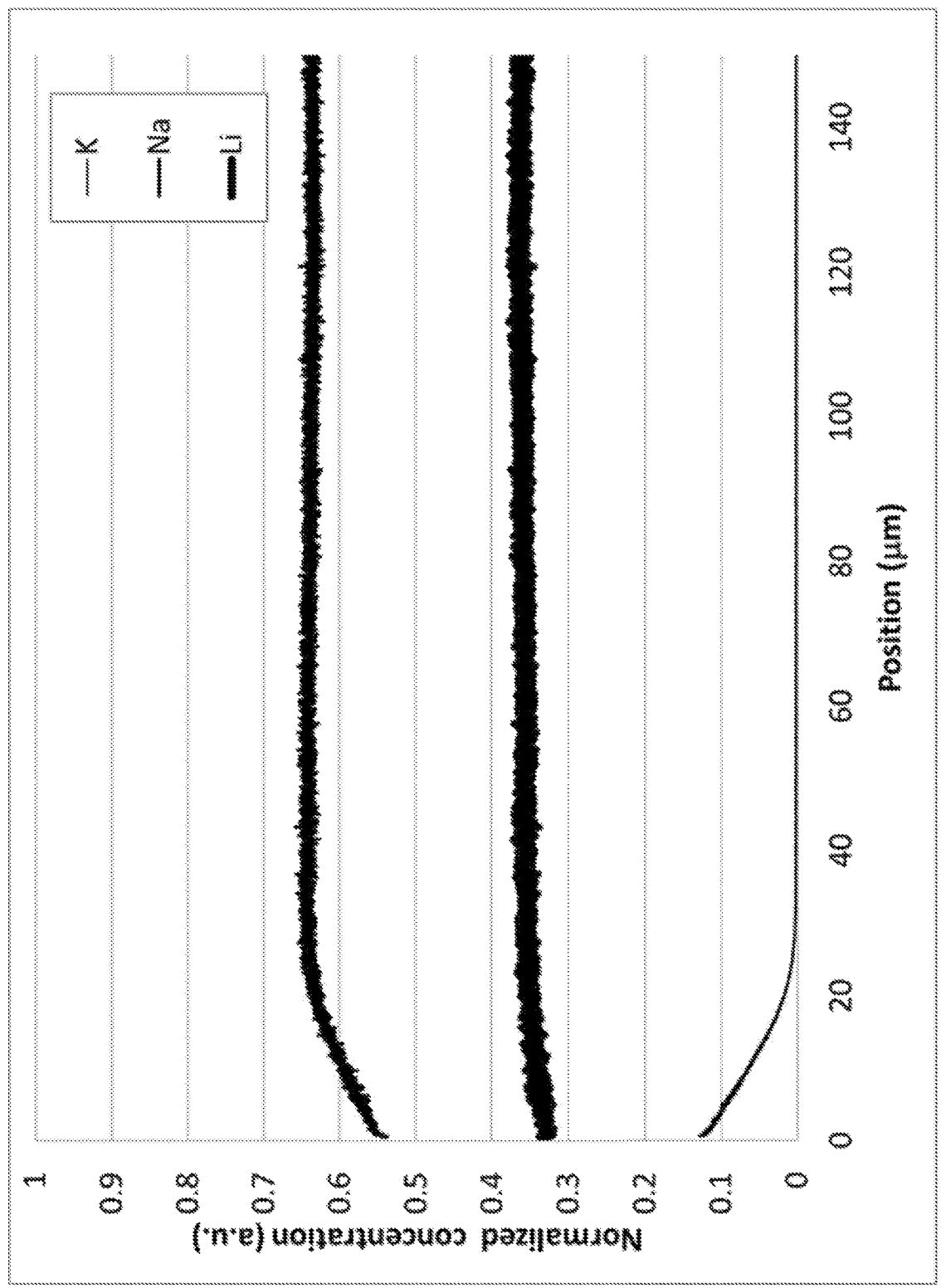
FIG. 19 is a graph of experimental results of a glass-based article that was prepared by a one-step "quasi-stoichiometric" IOX treatment according to an embodiment (Example 6) using a first IOX bath showing normalized concentration (a.u.) of ions versus position (micrometers from surface)

A first IOX bath composition was 25 wt % $KNO_3$+62.25 wt % $NaNO_3$+12.75 wt % $LiNO_3$ melted at 420° C. The diffusion time was 10 hours. FIG. 19 shows normalized concentration (a.u.) of ions versus position (micrometers from surface). Away from the surface where potassium is diffused, the glass substantially kept its original 62 mol % Na and 38 mol % Li composition.

Figure 20:
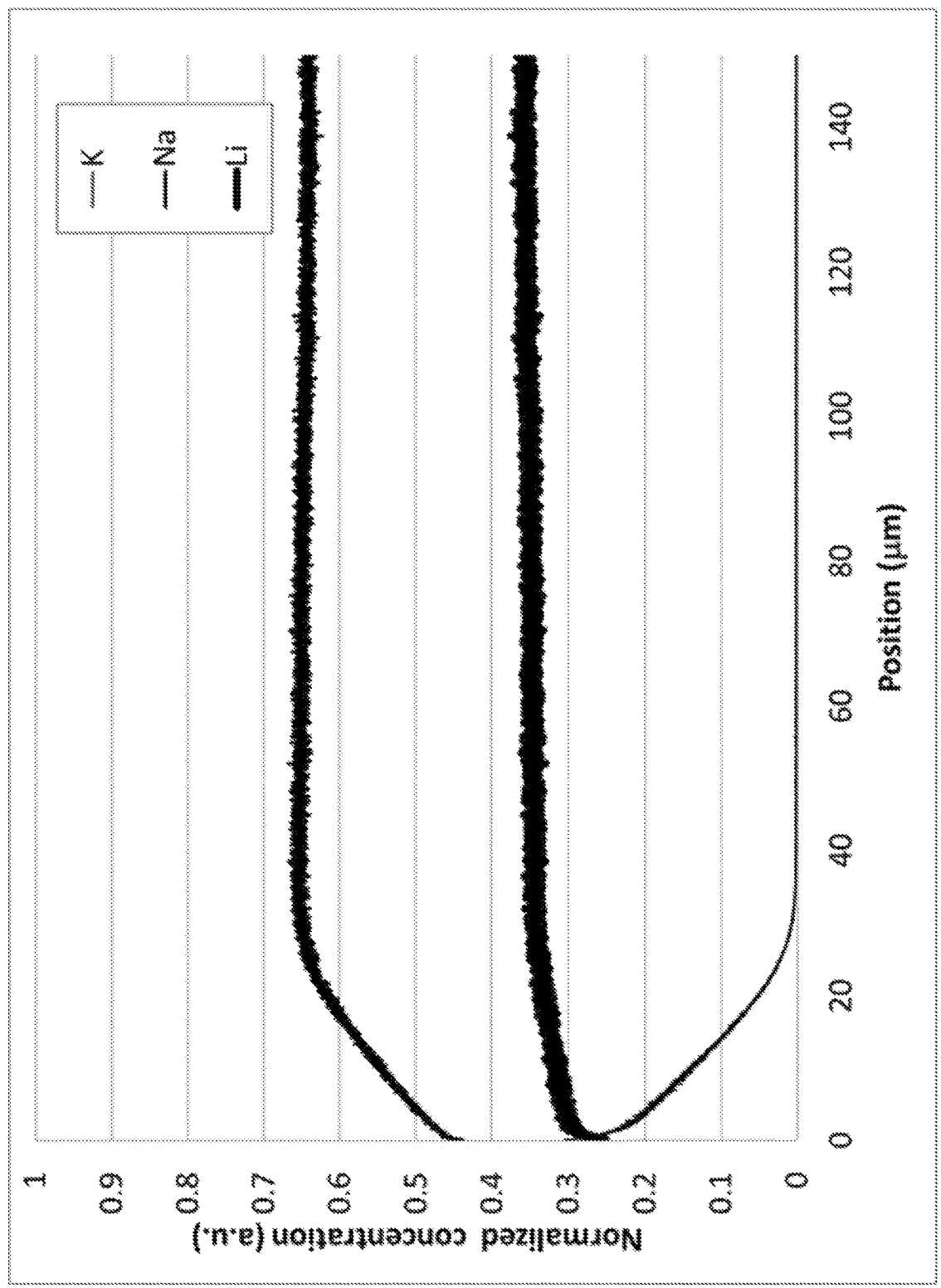
FIG. 20 is a graph of experimental results of a glass-based article that was prepared by a one-step "quasi-stoichiometric" IOX treatment according to an embodiment (Example 6) using a second IOX bath showing normalized concentration (a.u.) of ions versus position (micrometers from surface)

A second IOX bath composition was 50 wt % $KNO_3$+41.50 wt % $NaNO_3$+8.5 wt % $LiNO_3$ melted at 420° C. The diffusion time was 10 hours. FIG. 20 shows normalized concentration (a.u.) of ions versus position (micrometers from surface). Even with the higher K amount, away from the surface where potassium is diffused, the glass substantially kept its original 62 mol % Na and 38 mol % Li composition.

Here, for each bath, the potassium (ion not present in the substrate) from the mixed bath diffused near the surface while the ions at the center of the substrate remain approximately not changed. Outside the region where the potassium diffused, the article substantially kept the original base composition while only the slow potassium ions are diffused in the immediate outside surface.

Example 7

A glass-based article was formed from the above-referenced lithium-based glass-based substrate by a three-step ion exchange treatment including a "quasi-stoichiometric" bath and two traditional diffusion baths. Three different "quasi-stoichiometric" baths were tested. The resulting stress profiles were measured via a combination of refractive near field and Orihara FSM-6000 LE for surface stress.

A reference glass-based article without use of a quasi-stoichiometric bath (DIOX reference in FIG. 21A-21B) was prepared with a two-step traditional IOX treatment, "DIOX". The first traditional bath had a composition of: 25 wt % $KNO_3$+75 wt % $NaNO_3$, and the substrate was exposed to the first traditional bath for 4 hours and 10 minutes at 380° C. The second traditional bath had a composition of 91 wt % $KNO_3$+9 wt % $NaNO_3$, and the substrate was exposed to the second traditional bath for 28 minutes at 380° C.

The first IOX bath for Step I had a quasi-stoichiometric composition of 15 wt % $KNO_3$+70.55 wt % $NaNO_3$+14.55 wt % $LiNO_3$ melted at 420° C. The diffusion time was 10 hours resulting in a doped substrate. After Step I, the doped substrate was exposed to the DIOX conditions described with respect to the reference of this example. This is 15 K+DIOX in FIG. 21A-21B.

The second IOX bath for Step I had a quasi-stoichiometric composition of: 25 wt % $KNO_3$+62.25 wt % $NaNO_3$+12.75 wt % $LiNO_3$ melted at 420° C. The diffusion time was 10 hours resulting in a doped substrate. After Step I, the doped substrate was exposed to the DIOX steps described with respect to the reference of this example. This is 25 K+DIOX in FIG. 21A-21B.

The third IOX bath for Step I had a quasi-stoichiometric composition of: 50 wt % $KNO_3$+41.50 wt % $NaNO_3$+8.50 wt % $LiNO_3$ melted at 420° C. The diffusion time was 10 hours resulting in a doped substrate. After Step I, the doped substrate was exposed to the DIOX steps described with respect to the reference of this example. This is 50 K+DIOX in FIGS. 21A-21B.

Figure 21A:
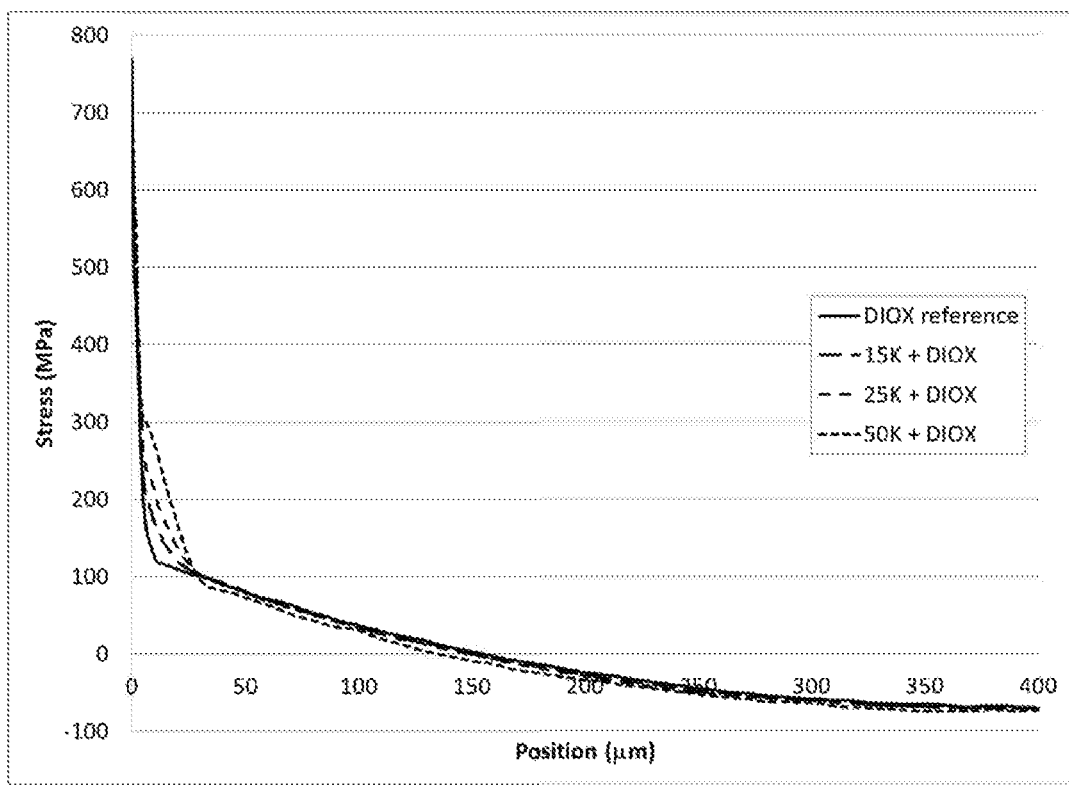
FIGS. 21A and 21B are graphs of experimental results of a glass-based article that was prepared by a three-step IOX treatment including a "quasi-stoichiometric" bath and two traditional diffusion baths according to an embodiment (Example 7), where three different "quasi-stoichiometric" baths were tested, showing: (a) stress (MPa) versus position (micrometers from surface) and (b) a magnified view of (a), respectively.

FIG. 21A provides experimentally measured stress (MPa) versus position (micrometers from surface), which shows that as the amount of potassium (K) in the first quasi-stoichiometric step increases, the stress in the vicinity of the surface at intermediate depths increases also. Moreover, due to force balance the extra area in compression at intermediate depths leads to a reduction in the DOC. However, there is a substantial increase in stress at intermediate depths and that can be increased both in magnitude and of depth by choosing different quasi-stoichiometric bath concentrations and modifying the time and temperature of the diffusion process.

Figure 21B:
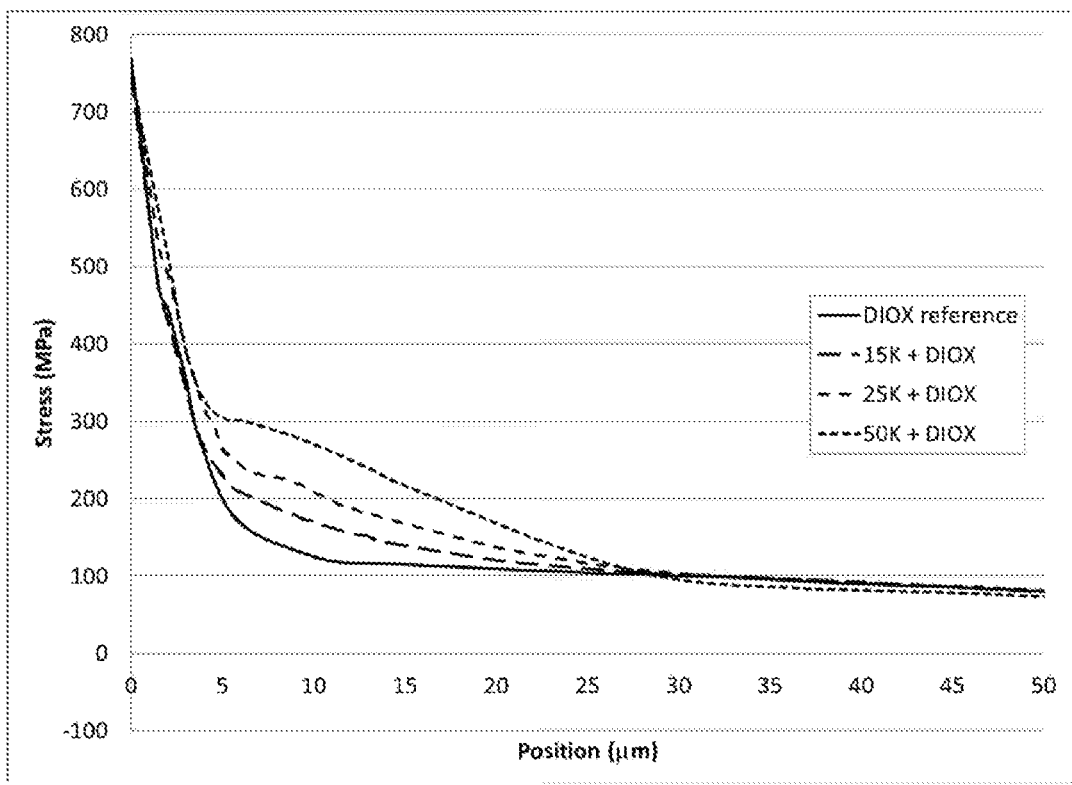

FIG. 21B is a magnified view of FIG. 21A, providing visualization of the gradual transition region between the spike and the tail of the stress profile. For using quasi-stoichiometric steps of lower values of potassium, such as the 15 K+DIOX recipe, the transition is gradual and concave. The 25 K+DIOX recipe the transition is more linear. The 50 K+DIOX leads to a more hump like transition region with a convex shape of the stress profile. These shapes are governed by the difference in potassium as defined by the first quasi-stoichiometric diffusion and the potassium in the subsequent DIOX steps.

Example 8

Testing

The glass-based articles of Example 7 were tested in a controlled-drop process. Multiple drops of glass were performed using a phone-sized puck being dropped onto a 180 grit sand-paper (to simulate rough surfaces). Drop tests were performed under ambient conditions (air, room temperature). The first drop was performed at a starting height of 20 cm, which represented the distance from the exposed surface of a cover glass to the top of a drop surface. If no cover glass failure occurred, the drop height was increased by 10 cm, and the puck dropped again. The puck was sequentially dropped at 10 cm increments (e.g., 10 cm, then 20 cm, then 30 cm, etc.) until the cover glass failed.

Figure 22:
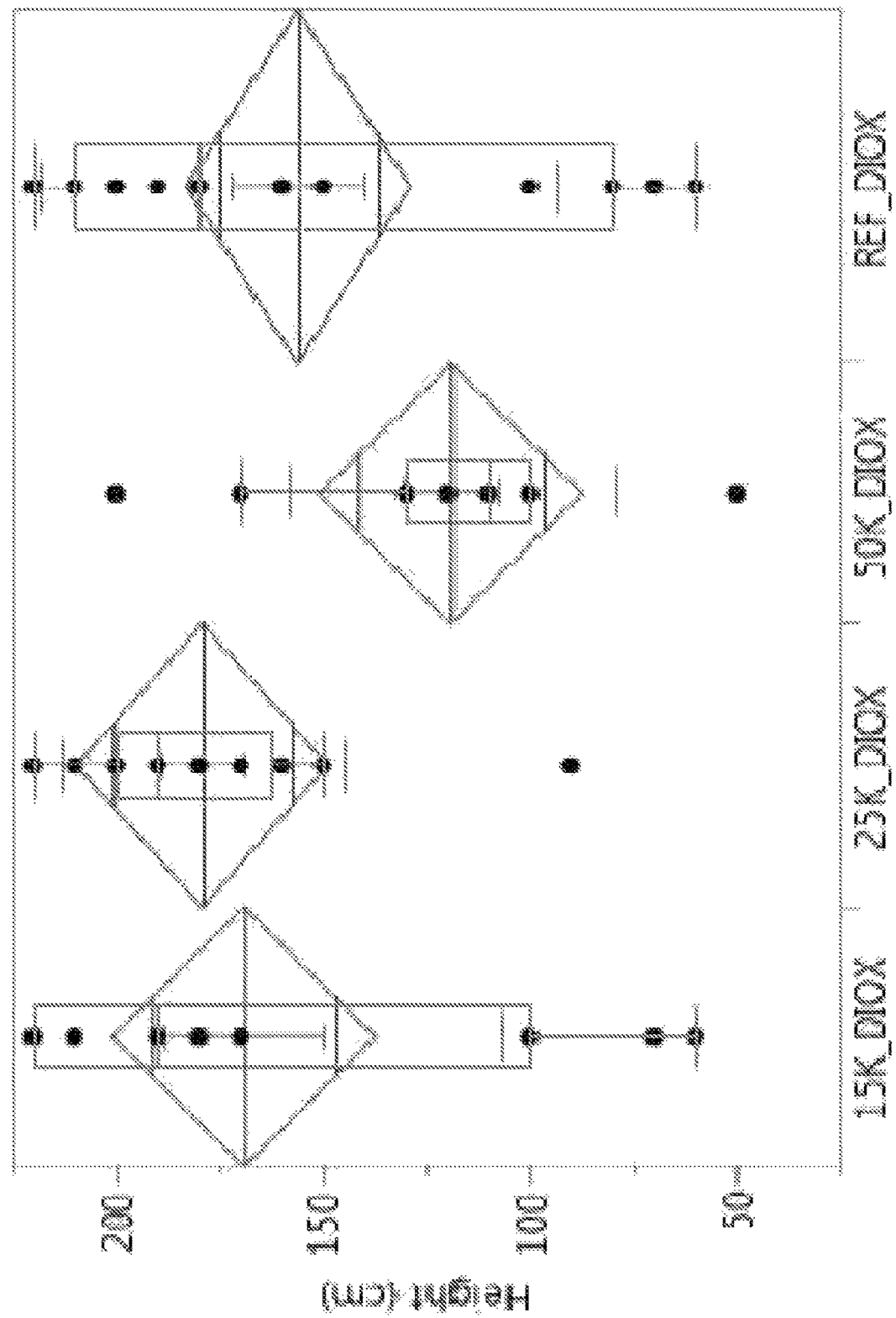
FIG. 22 is a graph of results in Table 1 of a controlled-drop process, where height where cover glass failure occurred is provided for four glass-based articles.

Table 1 provides the data and FIG. 22 is a graph of the data of Table 1, where "mean (cm)" represents the first height at which the sample broke. Standard deviation and error parameters (mean, lower 95%, upper 95%) are also provided in Table 1.

TABLE 1

| Sample | # tested | Mean (cm) | Std Dev. | Std Error Mean | Lower 95% | Upper 95% |
|---|---|---|---|---|---|---|
| 15K + DIOX | 11 | 169.091 | 62.5227 | 18.851 | 127.09 | 211.09 |
| 25K + DIOX | 12 | 179.167 | 34.4986 | 9.959 | 157.25 | 201.09 |
| 50K + DIOX | 11 | 119.091 | 39.6118 | 11.943 | 92.48 | 145.70 |
| DIOX | 15 | 156.000 | 62.5414 | 16.148 | 121.37 | 190.63 |

Samples 15 K+DIOX and 25 K+DIOX performed better than the original reference DIOX without the initial quasi-stoichiometric diffusion. Sample 50 K+DIOX, which had the largest potassium content and the largest contribution of induced stress due to the quasi-stoichiometric initial diffusion, did not perform well. This is likely due to the force balance that reduces significantly the DOC of this sample in comparison to the original reference DIOX. Therefore, there is a trade-off between the additional stress induced at intermediate depths and the depth of compression (DOC) where the stress reach zero in the center of the glass. This will likely vary with the type of device and application used but in the particular case of the current drop test with this phone puck the recipe 25 K+DIOX performed the best.

Example 9

A glass-based article was formed from the above-referenced lithium-based glass-based substrate by a two-step ion exchange treatment including a "quasi-stoichiometric" bath and one traditional diffusion bath. Two different "quasi-stoichiometric" baths were tested. The resulting stress profiles were measured via a combination of refractive near field and Orihara FSM-6000 LE for surface stress.

A reference glass-based article without use of a quasi-stoichiometric bath (DIOX reference in FIGS. 23A-23B) was prepared, in accordance with the reference of Example 7, with a two-step traditional IOX treatment, "DIOX". The first traditional bath had a composition of: 25 wt % $KNO_3$+75 wt % $NaNO_3$, and the substrate was exposed to the first traditional bath for 4 hours and 10 minutes at 380° C. The second traditional bath had a composition of 91 wt % $KNO_3$+9 wt % $NaNO_3$, and the substrate was exposed to the second traditional bath for 28 minutes at 380° C.

The first IOX bath for Step I had a quasi-stoichiometric composition of 25 wt % $KNO_3$+62.25 wt % $NaNO_3$+12.75 wt % $LiNO_3$ melted at 420° C. The diffusion time was 10 hours resulting in a doped substrate. After Step I, the doped substrate was exposed to a SIOX step, which included a bath having a composition of 80 wt % $KNO_3$+20 wt % $NaNO_3$, to which the substrate was exposed for 6 hours at 380° C. This is 25 K+SIOX_6 h in FIGS. 22A-22B.

The second IOX bath for Step I had a quasi-stoichiometric composition of: 50 wt % $KNO_3$+41.50 wt % $NaNO_3$+8.50 wt % $LiNO_3$ melted at 420° C. The diffusion time was 10 hours resulting in a doped substrate. After Step I, the doped substrate was exposed to a SIOX step, which included a bath having a composition of: 80 wt % $KNO_3$+20 wt % $NaNO_3$, to which the substrate was exposed for 4 hours at 380° C. This is 50 K+SIOX_4 h in FIGS. 23A-23B.

Figure 23A:
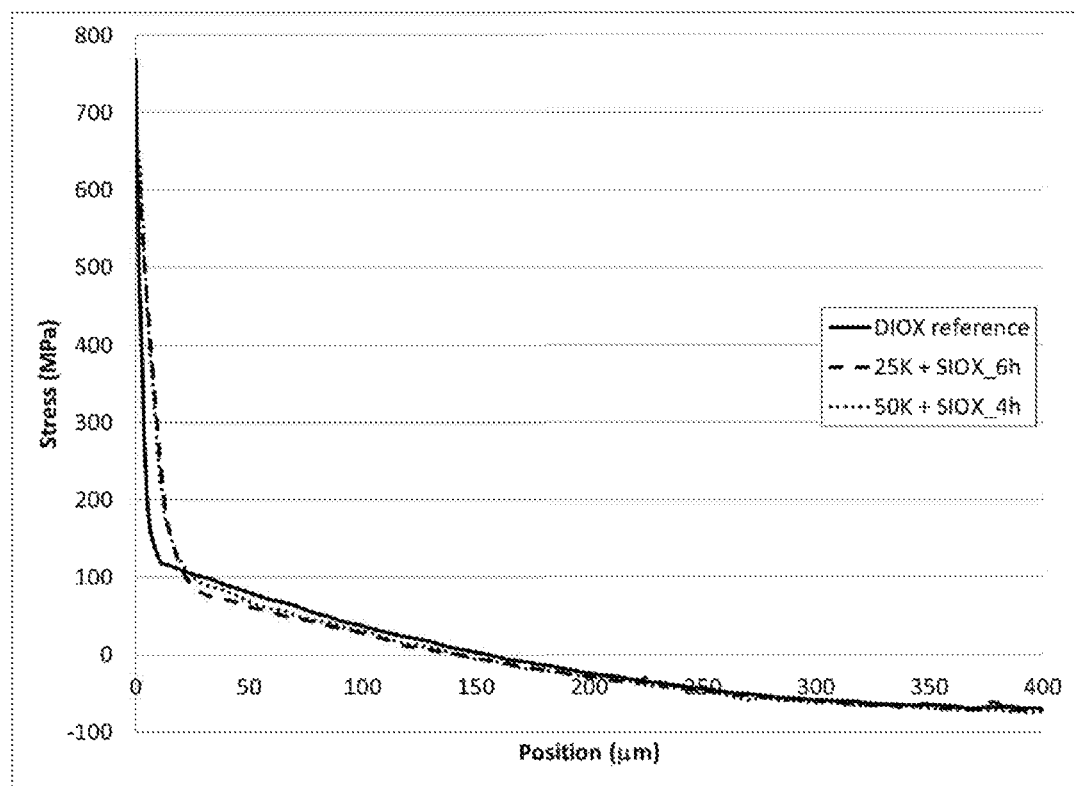
FIGS. 23A and 23B are graphs of experimental results of a glass-based article that was prepared by a two-step IOX treatment including a "quasi-stoichiometric" bath and two traditional diffusion baths according to an embodiment (Example 9), where two different "quasi-stoichiometric" baths were tested, showing: (a) stress (MPa) versus position (micrometers from surface) and (b) a magnified view of (a), respectively.

FIG. 23A provides experimentally measured stress (MPa) versus position (micrometers from surface), which shows that as the amount of potassium (K) in the first quasi-stoichiometric step increases, the stress in the vicinity of the surface at intermediate depths increases also. Moreover due to force balance the extra area in compression at intermediate depths leads to a reduction in the DOC. However there is substantial increase in stress at intermediate depths and that can be increased both in magnitude and of depth by choosing different quasi-stoichiometric bath concentrations and modifying the time and temperature of the diffusion process.

Example 9, which used SIOX treatment after the quasi-stoichiometric treatment, differs from Example 7, which used a DIOX treatment after the quasi-stoichiometric treatment. Similar results for tailoring stress profiles can be achieved with a first quasi-stoichiometric process as a first step followed by a single SIOX. With the use of SIOX, stress at the surface (CS) would be dominated by the SIOX after the quasi-stoichiometric step. There can still be control over the stresses in the range of 10-30 micrometers and a significant depth of compression (DOC).

Figure 23B:
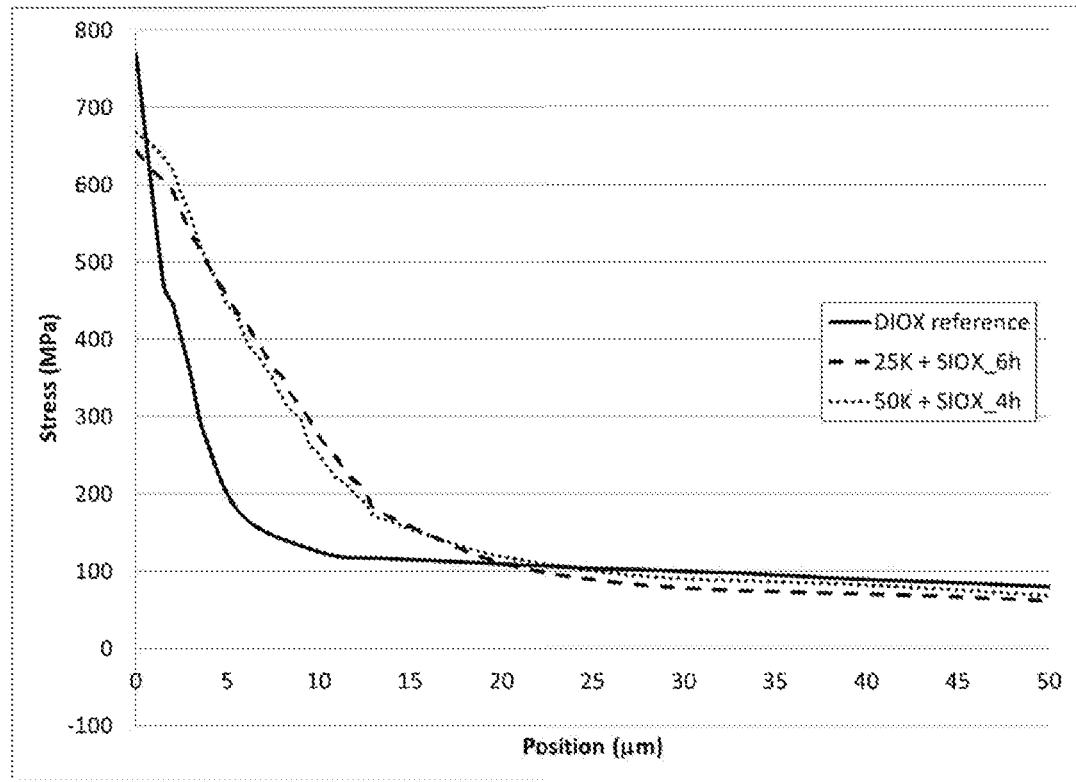

FIG. 23B is a magnified view of FIG. 23A, providing visualization of the gradual transition region between the spike and the tail of the stress profile. For the 25 K+SIOX and the 50 K+SIOX the transition is about linear.

While the foregoing is directed to various embodiments, other and further embodiments of the disclosure may be devised without departing from the basic scope thereof, and the scope thereof is determined by the claims that follow.

What is claimed is:
1. A glass-based article comprising:
opposing first and second surfaces defining a thickness (t);
a central composition at the center of the glass-based article containing two alkali metal oxides;

a surface concentration of each of the two alkali metal oxides being non-zero at one or both of the first and second surfaces; and a metal oxide, different from the two alkali metal oxides of the central composition, having a non-zero concentration that varies from the first surface to a depth of layer (DOL) with respect to the metal oxide;

wherein at a depth of about three times the DOL, a molar concentration of each of the two alkali metal oxides in the glass-based article is ±5% of a respective molar concentration of each of the two alkali metal oxides in the central composition of the glass-based article.

2. The glass-based article of claim 1, wherein the glass-based article comprises an alkali-aluminosilicate, an alkali-containing borosilicate, an alkali-containing aluminoborosilicate, or an alkali-containing phosphosilicate.

3. The glass-based article of claim 1, wherein the central composition comprises 1 mol % or less of the metal oxide different from the two alkali metal oxides of the central composition.

4. The glass-based article of claim 1, wherein the metal oxide different from the two alkali metal oxides of the central composition is selected from the group consisting of: lithium (Li), sodium (Na), potassium (K), rubidium (Rb), cesium (Cs), francium (Fr), silver (Ag), gold (Au), copper (Cu), and combinations thereof.

5. The glass-based article of claim 1, wherein the two alkali metal oxides of the central composition comprise lithium and sodium, and the metal oxide different from the two alkali metal oxides of the central composition is potassium.

6. A consumer electronic product comprising:
a housing having a front surface, a back surface, and side surfaces;
electrical components provided at least partially within the housing, the electrical components including at least a controller, a memory, and a display, the display being provided at or adjacent the front surface of the housing; and
a cover disposed over the display;
wherein at least a portion of at least one of the housing and the cover comprises the glass-based article of one of claim 1.

7. A glass-based article comprising:
opposing first and second surfaces defining a thickness (t);
a central composition at the center of the glass-based article containing two alkali metal oxides;
a surface concentration of each of the two alkali metal oxides being non-zero at one or both of the first and second surfaces;
a metal oxide, different from the two alkali metal oxides of the central composition, having a non-zero concentration that varies from the first and second surfaces to a depth of layer (DOL) of the metal oxide; and
a stress profile comprising:
a depth of compression (DOC) that is greater than or equal to 0.13·t;
a spike region extending from the first surface to a transition region;
the transition region extending to a tail region; and
the tail region extending to a center of the glass-based article;
wherein the transition region comprises a first compressive stress at greater than or equal to about 0.00625·t depth from the first surface of at least about 150 MPa, and a second compressive stress at greater than or equal to about 0.025·t depth from the first surface of at least about 120 MPa; and
at a depth of 20 micrometers or more a concentration of the metal oxide different from the two alkali metal oxides of the central composition is 0.3% by weight or more of all alkali metals in the glass-based article.

8. The glass-based article of claim 7, wherein the first compressive stress is located between about 5 and 10 micrometers depth from the first surface and is in the range of about 150 MPa to about 300 MPa, and the second compressive stress is located between about 15 and 20 micrometers depth from the first surface and is in the range of about 120 MPa to about 240 MPa.

9. The glass-based article of claim 7, wherein the glass-based article comprises an alkali-aluminosilicate, an alkali-containing borosilicate, an alkali-containing aluminoborosilicate, or an alkali-containing phosphosilicate.

10. The glass-based article of claim 7, wherein the central composition comprises 1 mol % or less of the metal oxide different from the two alkali metal oxides of the central composition.

11. The glass-based article of claim 7, wherein the metal oxide different from the two alkali metal oxides of the central composition is selected from the group consisting of: lithium (Li), sodium (Na), potassium (K), rubidium (Rb), cesium (Cs), francium (Fr), silver (Ag), gold (Au), copper (Cu), and combinations thereof.

12. The glass-based article of claim 7, wherein all points of the stress profile located in the spike region comprise a tangent having an absolute value that is 20 MPa/micrometer or greater.

13. The glass-based article of claim 7, wherein the two alkali metal oxides of the central composition comprise lithium and sodium, and the metal oxide different from the two alkali metal oxides of the central composition is potassium.

14. A glass-based article comprising:
opposing first and second surfaces defining a thickness (t);
a central composition at the center of the glass-based article containing lithium and one or more additional alkali metal oxides;
a surface concentration of each of the lithium and the one or more additional alkali metal oxides being non-zero at one or both of the first and second surfaces;
a metal oxide, different from lithium and the one or more additional alkali metal oxides of the central composition, having a non-zero concentration that varies from the first and second surfaces to a depth of layer (DOL) of the metal oxide;
a depth of compression (DOC) that is greater than or equal to about 0.13·t; and
a first compressive stress at from about 5 micrometers to 10 micrometers depth from the first surface is at least 150 MPa, and a second compressive stress at from about 15 micrometers to about 20 micrometers depth from the first surface is at least 120 MPa;
wherein at a depth of 20 micrometers or more a concentration of the metal oxide different from the lithium and the one or more additional alkali metal oxides of the central composition is 0.3% by weight or more of all alkali metals in the glass-based article.

15. The glass-based article of claim 14, wherein the glass-based article comprises an alkali-aluminosilicate, an alkali-containing borosilicate, an alkali-containing aluminoborosilicate, or an alkali-containing phosphosilicate.

16. The glass-based article of claim 14, wherein the central composition comprises 1 mol % or less of the metal oxide different from the lithium and the one or more additional alkali metal oxides of the central composition.

17. The glass-based article of claim 14, wherein the metal oxide different from the lithium and the one or more additional alkali metal oxides of the central composition is selected from the group consisting of: sodium (Na), potassium (K), rubidium (Rb), cesium (Cs), francium (Fr), silver (Ag), gold (Au), copper (Cu), and combinations thereof.

18. The glass-based article of claim 14, wherein at a depth of 3 to 10 micrometers or more a concentration of the metal oxide different from the lithium and the one or more additional alkali metal oxides of the central composition is 5% by weight or more of all alkali metals in the glass-based article.

* * * * *

UNITED STATES PATENT AND TRADEMARK OFFICE
CERTIFICATE OF CORRECTION

PATENT NO. : 11,312,657 B2
APPLICATION NO. : 16/458583
DATED : April 26, 2022
INVENTOR(S) : Schneider Page 1 of 1

It is certified that error appears in the above-identified patent and that said Letters Patent is hereby corrected as shown below:

On the Title Page

On the page 2, in Column 1, item (56) under "Other Publications", Line 1, delete "Exvhange" and insert -- Exchange --.

On the page 2, in Column 1, item (56) under "Other Publications", Line 4, delete "Molton" and insert -- Molten --.

Signed and Sealed this
Twenty-seventh Day of September, 2022

Katherine Kelly Vidal
*Director of the United States Patent and Trademark Office*